United States Patent
Kawasaki

(10) Patent No.: US 7,599,428 B2
(45) Date of Patent: *Oct. 6, 2009

(54) FREQUENCY-DIVISION MULTIPLEXING TRANSCEIVER APPARATUS AND METHOD

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 582 days.

This patent is subject to a terminal disclaimer.

(21) Appl. No.: 11/452,964

(22) Filed: Jun. 15, 2006

(65) Prior Publication Data

US 2007/0189414 A1 Aug. 16, 2007

(30) Foreign Application Priority Data

Feb. 15, 2006 (JP) .............................. 2006-038009

(51) Int. Cl.
*H04L 5/16* (2006.01)

(52) U.S. Cl. ...................................... 375/219; 375/295

(58) Field of Classification Search ................ 375/260, 375/295, 377; 370/319, 344
See application file for complete search history.

(56) References Cited

U.S. PATENT DOCUMENTS

2004/0156386 A1 8/2004 Atarashi et al.

2005/0260968 A1* 11/2005 Ito et al. ..................... 455/337
2008/0225895 A1* 9/2008 Lee et al. .................... 370/483

FOREIGN PATENT DOCUMENTS

JP 2005-057582 3/2005

OTHER PUBLICATIONS

Schnell, Michael et al., "Application of IFDMA to Mobile Radio Transmission," Universal Personal Communications, ICUPC 1998, IEEE 1998 International Conference on Florence, Italy, IEEE, vol. 2, Oct. 5, 1998, pp. 1267-1272.

* cited by examiner

*Primary Examiner*—Emmanuel Bayard
(74) *Attorney, Agent, or Firm*—Myers Wolin, LLC

(57) ABSTRACT

A frequency-division multiplexing transmission apparatus that transmits data at a frequency spectrum specific to a mobile station in which a π/4-continuous-phase-rotation unit performs phase rotation that increases in increments of π/4 or decreases in decrements of −π/4 for each symbol of a transmission-symbol sequence; a symbol-repetition and rearrangement unit compresses the time domains of each symbol of the transmission-symbol sequence after phase rotation, then repeats those symbols a specified number of times (L times), and rearranges the symbols of the obtained repetitive-symbol sequence so that it has the same arrangement as the original transmission-symbol sequence; a phase-rotation unit performs phase rotation that changes at a speed specific to the mobile station for each symbol of the rearranged repetitive-symbol sequence; and a transmission unit transmits the phase-rotated symbols.

14 Claims, 22 Drawing Sheets

FIG. 1
(A)
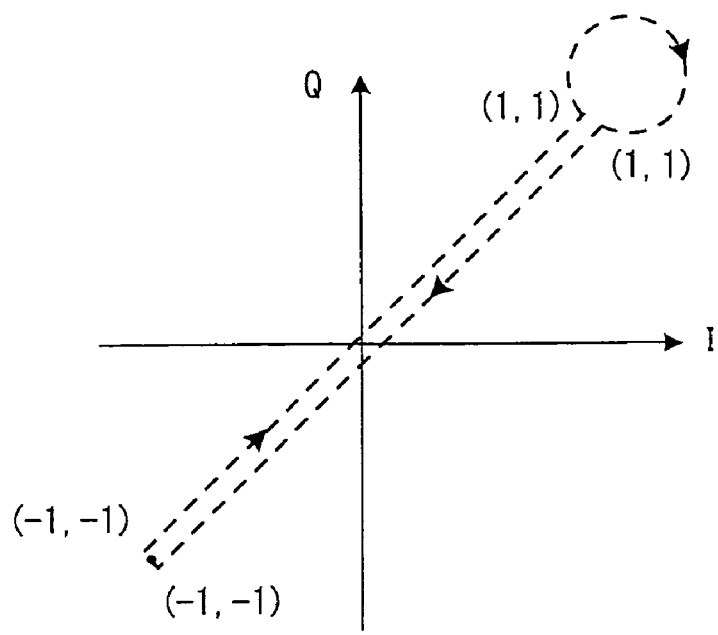
(B)
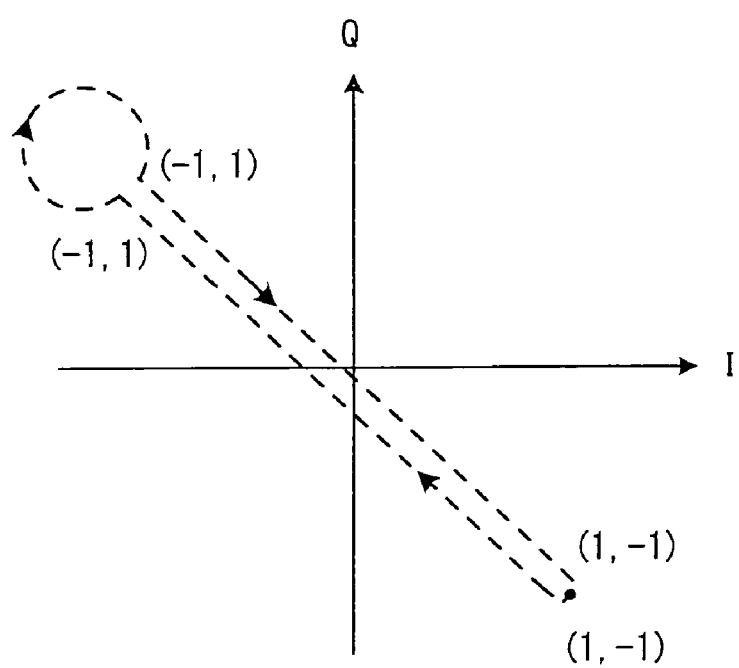

FIG. 5

| |
|---|
| S00 = S0 |
| S11 = S1 × exp( j ((1+1) π /4)) = S1 × exp( j (π /2)) |
| S02 = S0 × exp( j (2 π /4)) = S0 × exp( j (π /2)) |
| S13 = S1 × exp( j ((1+3) π /4)) = S1 × exp( j (2 π /2)) |
| S04 = S0 × exp( j (4 π /4)) = S0 × exp( j (2 π /2)) |
| S15 = S1 × exp( j ((1+5) π /4)) = S1 × exp( j (3 π /2)) |
| S06 = S0 × exp( j (6 π /4)) = S0 × exp( j (3 π /2)) |
| S17 = S1 × exp( j ((1+7) π /4)) = S1 × exp( j (4 π /2)) |

FIG. 9

| |
|---|
| S00 = S0 |
| S11 = S1 × exp( j (π/4)) |
| S02 = S0 × exp( j (π/2)) |
| S13 = S1 × exp( j (π/4 + π/2)) = S1 × exp( j (3π/4)) |
| S04 = S0 × exp( j (2π/2)) = S0 × exp( j (π)) |
| S15 = S1 × exp( j (π/4 + 2π/2)) = S1 × exp( j (5π/4)) |
| S06 = S0 × exp( j (3π/2)) |
| S17 = S1 × exp( j (π/4 + 3π/2)) = S1 × exp( j (7π/4)) |

FIG. 16

| |
|---|
| S00 = S0 |
| S11 = S1 × exp( j ( π /4)) |
| S02 = S0 × exp( j ( π /2)) |
| S13 = S1 × exp( j ( π /4 + π /2)) = S1 × exp( j (3 π /4)) |
| S04 = S0 × exp( j (2 π /2)) = S0 × exp( j ( π )) |
| S15 = S1 × exp( j ( π /4 + 2 π /2)) = S1 × exp( j (5 π /4)) |
| S06 = S0 × exp( j (3 π /2)) |
| S17 = S1 × exp( j ( π /4 + 3 π /2)) = S1 × exp( j (7 π /4)) |

FREQUENCY-DIVISION MULTIPLEXING TRANSCEIVER APPARATUS AND METHOD

BACKGROUND OF THE INVENTION

This invention relates to a frequency-division multiplexing transceiver apparatus and method for sending and receiving data by a mobile-station-specific frequency spectrum, and more particularly to a frequency-division multiplexing transmission apparatus and method for transmitting a transmission symbol upon subjecting the symbol to phase rotation that varies at a speed specific to the mobile station.

DS-CDMA (Direct Sequence-Code Division Multiple Access) multiplies a narrow-band transmission signal by a spreading code in order to spread and transmit that transmission signal over a wider band. In DS-CDMA, when each of a plurality of mobile stations sends a transmission signal upon multiplying it by a spreading code having a certain spreading factor SF, the information transmission speed becomes 1/SF. Therefore, in order to achieve a frequency utilization efficiency that is equivalent to that of TDMA, it is necessary in DS-CDMA to accommodate a number of signals that is equal to SF number of mobile stations. However, in an actual wireless propagation environment on the uplink, the effect of Multiple Access Interference (MAI), in which the signals from each of the mobile stations interfere with each other, becomes dominant due to differences in propagation conditions from each mobile station to the base station, for example, due to differences in propagation-delay time or propagation-path fluctuation, and thus the rate of frequency utilization decreases.

Therefore, IFDMA (Interleaved Frequency Division Multiple Access) is being studied as a wireless modulation method that is capable of reducing the effects of MAI in next-generation mobile communications (see the specification of JP2004-297756 A, and "Investigations on Packet Error Rate of Variable Spreading and Chip Repetition Factors (VSCRF)-CDMA Wireless Access in Reverse Link Multi-cell Environment", The Institute of Electronics, Information and Communication Engineers, Technical Report of IEICE, RCS2004-84 (204-206)). This IFDMA modulation method transmits a transmission signal upon multiplying the signal by a phase that changes at a speed specific to the mobile station, thereby reducing MAI by placing the signals from each of the mobile stations on a frequency axis in such a manner that the signals will not overlap each other on the frequency axis.

FIG. 18 is a block diagram showing the structure of a mobile station that uses an IFDMA modulation method, and FIG. 19 is a drawing that explains an IFDMA symbol. A channel encoder 1a performs channel encoding by applying error-correction encoding such as turbo encoding or convolutional encoding to an entered binary information sequence, and a data modulator 1b converts the channel-encoded data to I, Q complex components (symbols) in QPSK, for example. A symbol transmitted in one frame of IFDMA is referred to as an "IFDMA symbol", and one IFDMA symbol is composed of Q-number of symbols S0, S1, S2, S3 as shown in (a) of FIG. 19 (Q=4 in the figure).

A symbol-repetition and rearrangement unit 1c compresses the time domains of the four symbols S0, S1, S2 and S3 of the IFDMA symbol, and repeatedly generates each symbol L times (L=4 in the figure), as well as rearranges the repeatedly generated symbols and places them in the same arrangement as that of the symbol sequence S0, S1, S2, S3 (see (b) of FIG. 19). By taking Tc to be the sample period, the period Ts of symbol repetition will satisfy the relation Ts=Tc×Q. A phase-rotation unit 1d has a complex multiplier CML that performs mobile-station specific phase rotation of each symbol in the repetitive symbol sequence (see (c) of FIG. 19), and a wireless transmitter 1e performs up-conversion of the signal that is input from the phase-rotation unit 1d from baseband frequency to radio frequency, after which it amplifies the signal and transmits it from an antenna.

When the time domains of the transmission-symbol sequence S0, S1, S2, S3 are compressed and each transmission symbol is repeatedly generated a prescribed number of times (L times), and each of the symbols of the repetitive-symbol sequence are rearranged so as to have the same arrangement as that of the symbol sequence S0, S1, S2, S3, the repetitive-symbol sequence after rearrangement will have a comb-tooth-shaped frequency spectrum as shown in (a) of FIG. 20. Also, by performing phase rotation that varies at a speed that is specific to the mobile station on each of the symbols of the rearranged repetitive-symbol sequence, the spectral positions of the comb-tooth-shaped frequency spectrum shift as shown in (a) to (d) of FIG. 20, and frequency-division multiplex transmission becomes possible. In other words, when the speed of phase rotation is zero, the frequency spectrum of the output signal from the phase-rotation unit 1d will have comb-tooth-shaped frequency spectrum characteristics as shown in (a) of FIG. 20, and as the amount of change in the phase rotation (frequency) per unit time Tc increases, the frequency spectrum will shift as shown in (a) to (d) of FIG. 20.

An NCO (Numerically Controlled Oscillator) 1g calculates the amount of phase rotation θ per unit time Tc, and the complex multiplier of the phase-rotation unit 1d performs phase rotation specific to the mobile station for each symbol of the repetitive-symbol sequence and executes frequency shift processing.

The phase $\theta_k(t)$ that is output from the NCO 1g after repeating Q-number of symbols L times is given by the following equation:

$$\theta_k(t) = k \cdot 2\pi \frac{W}{L} \cdot t = k \cdot 2\pi \frac{1}{L \cdot Q \cdot Tc} \cdot t \qquad (1)$$

$$W = \frac{1}{Ts} \quad QW = \frac{1}{Tc}$$

where W is the symbol frequency, and k is a value that corresponds to the mobile station and is any one value among 0, 1, 2, ... L−1. NCO 1g outputs the phase θk(t), which has been calculated according to Equation (1), at the period Tc, and is so adapted that the amount of phase rotation will be 2π at the IFDMA period (=L·Q·Tc=16Tc) (such that the phase will make one full cycle for the IFDMA period).

In NCO 1g, a frequency-shift-setting unit 1h sets the amount of change of phase rotation(angular speed) Δω per unit time Tc, and using the parameters k, L and Q, calculates the angular speed Δω according to the following equations:

$$\Delta\omega = k \cdot 2\pi \frac{W}{L} = k \cdot 2\pi \frac{1}{L \cdot Q} \qquad (2)$$

$$f = \frac{\Delta\omega}{2\pi \cdot Tc} = \frac{k}{L \cdot Q \cdot Tc}$$

A rotation-phase-amount-setting unit 1i comprises an adder ADD and a delay unit DLY for applying a delay time T (=Tc), and performs a calculation according to the following equation every unit time Tc to increase the rotation phase θ by Δω at a time and output the result.

$$\theta = \theta + \Delta\omega \quad (3)$$

A converter $1j$ calculates I, Q components (x, y) in a complex plane of the rotation phase amount θ and inputs these components to the phase-rotation unit $1d$. By taking the symbols of the repetitive-symbol sequence to be S (=X+jY), the phase-rotation unit $1d$ performs a calculation according to the following equation and outputs the calculation result.

$$(X+jY) \times (x+jy)$$

In actuality, the complex multiplier CML of the phase-rotation unit $1d$ calculates and outputs (Xx−Yy) and (Xy+Yx) for each real-number and imaginary-number part.

If k=0, the amount of frequency shift will be zero (Δf=0), and the frequency spectrum will become as shown in (a) of FIG. 20. If k=1, the amount of frequency shift will become Δf=2π/L×Q according to Equation (2), and if Q=L=4, then the phase will change in increments of π/8 as shown in (c) of FIG. 21, and the frequency spectrum will become as shown in (d) of FIG. 21 or (b) of FIG. 20. Also, if k=2, the amount of frequency shift will become Δf=4π/L×Q according to Equation (2). If Q=L=4, then the phase will change in increments of π/4 for each Tc, and the frequency spectrum will become as shown in (c) of FIG. 20. Moreover, if k=3, then the amount of frequency shift will become Δf=6π/L×Q according to Equation (2). If Q=L=4, then the phase will change in increments of 3π/8 for each Tc, and the frequency spectrum will become as shown in (d) of FIG. 20. As a result, even when a plurality of mobile stations access the same base station simultaneously, the frequency spectrum of each mobile station will be orthogonal on the frequency axis, and it is possible to reduce interference among transmission signals.

A mobile station is normally battery operated, and in order to lengthen the possible communication time, it is desired that the efficiency of the transmission amplifier in the wireless unit be increased. Also, in order that the transmission signal is not distorted by the transmission amplifier, linear characteristics are desired. The input/output characteristics of the transmission amplifier show linear characteristics when the input power is low as shown in FIG. 22, however, as the input power increases, the input/output characteristics become non-linear when the input power becomes Pmax or greater, as shown by the dotted line. When the input power becomes Pmax or greater, non-linear distortion occurs due to this non-linear characteristic.

As operation point approaches Pmax, in order to use the transmission amplifier with high efficiency, the input power exceeds Pmax and distortion occurs when the transmission signal is large, however, when operation point is distant from the Pmax so that distortion does not occur, the efficiency of the transmission amplifier drops. In order to satisfy these conflicting needs, it is important that the PAPR (Peak to Average Power Ratio) of the transmission signal be made small. PAPR is the ratio between the peak power value and average power value of the transmission signal. In a case where PAPR is large, the signal that is output from the amplifier becomes distorted when the operation point of the amplifier approaches Pmax and the transmission signal is at a peak, and in a case where PAPR is small, the signal that is output from the amplifier does not become distorted when the transmission signal is at a peak, and it is possible to use the amplifier efficiently.

There is prior art whose object is to reduce the peak factor in the CDMA modulation method (see the specification of JP2005-57582 A). In this prior art, when a multiplexed CDMA signal exceeds the input-limit of the transmission amplifier, power control is performed for the symbol of which position in a I-Q complex plane is near a specified symbol location, and power-level control is performed, taking into consideration the symbol rate of the user and required SIR.

However, in this prior art, the PAPR of the transmission signal is not reduced in the IFDMA modulation method.

SUMMARY OF THE INVENTION

Accordingly, an object of the present invention is to reduce the PAPR of a transmission signal in the IFDMA modulation method.

Another object of the present invention is to use a transmission amplifier efficiently without the occurrence of distortion by reducing the PAPR of a transmission signal.

First Frequency-Division Multiplexing Transceiver Apparatus and Method

A first frequency-division multiplexing transmission apparatus of the present invention transmits data in a frequency spectrum specific to a mobile station, and comprises: a π/4-continuous-phase-rotation unit, a symbol-repetition and rearrangement unit, a phase-rotation unit and a transmission unit. The π/4-continuous-phase-rotation unit performs phase rotation that increases in increments of π/4 or decreases in decrements of −π/4 for each symbol of a transmission-symbol sequence; the symbol-repetition and rearrangement unit compresses the time domains of each symbol of the transmission-symbol sequence after phase rotation, then repeats those symbols a specified number of times (L times), and rearranges the symbols of the obtained repetitive-symbol sequence so that it has the same arrangement as the transmission-symbol sequence; the phase-rotation unit performs phase rotation that changes at a speed specific to the mobile station for each symbol of the rearranged repetitive-symbol sequence; and the transmission unit transmits the phase-rotated symbols.

In regards to the phase rotation, the phase-rotation unit changes the amount of rotation performed on each symbol of the repetitive-symbol sequence in increments of k·2π/L (where k is an integer specific to the mobile station) at each period of the repetitive-symbol sequence.

A first frequency-division multiplexing receiving apparatus of the invention comprises: a receiving unit, a phase-rotation unit, and a demodulation unit; where the receiving unit receives each symbol of a repetitive-symbol sequence that is transmitted from the transmission apparatus; the phase-rotation unit generates phase that changes in increments of k·2π/L (where k is an integer specific to the mobile station) at each period of the repetitive-symbol sequence for each mobile station, and performs phase rotation having that phase for each received symbol of the repetitive-symbol sequence; and the demodulation unit combines components of identical symbols that are output from the phase-rotation unit at each period of the repetitive-symbol sequence, and performs phase rotation that decreases in decrements of −π/4 or increases in increments of π/4 for each symbol of the combined symbol sequence to demodulate the transmission symbols.

Second Frequency-Division Multiplexing Transceiver Apparatus and Method

A second frequency-division multiplexing transmission apparatus transmits data in a frequency spectrum specific to a mobile station, and comprises: a π/4-phase-rotation unit, a symbol-repetition and rearrangement unit, a phase-rotation unit and a transmission unit. The π/4-phase-rotation unit performs π/4 or −π/4 phase rotation for the even-numbered or odd-numbered symbols of a transmission-symbol sequence; the symbol-repetition and rearrangement unit compresses the time domains of each symbol of the transmission-symbol sequence after phase rotation, then repeats those symbols a specified number of times (L times), and rearranges the symbols of the obtained repetitive-symbol sequence so that it has the same arrangement as the transmission-symbol sequence; the phase-rotation unit performs phase rotation that changes at a speed specific to the mobile station for each symbol of the rearranged repetitive-symbol sequence; and the transmission unit transmits the phase-rotated symbols. In regards to the phase rotation, the phase-rotation unit changes the amount of rotation performed on each symbol of the repetitive-symbol sequence in increments of k·2π/L (where k is an integer specific to the mobile station) at each period of the repetitive-symbol sequence.

A second frequency-division multiplexing receiving apparatus of the invention comprises: a receiving unit, a phase-rotation unit, and a demodulation unit; where the receiving unit receives each symbol of a repetitive-symbol sequence that is transmitted from the transmission apparatus; the phase-rotation unit generates phase that changes in increments of k·2π/L (where k is an integer specific to the mobile station) at each period of the repetitive-symbol sequence for each mobile station, and performs phase rotation having that phase for each received symbol of the repetitive-symbol sequence; and the demodulation unit combines components of identical symbols that are output from said phase-rotation unit at each period of the repetitive-symbol sequence, and performs −π/4 or π/4 phase rotation for the even-numbered or odd-numbered symbols to demodulate the transmission symbols.

With the first frequency-division multiplexing transmission apparatus and method of the present invention, phase rotation that increases in increments of π/4 or decreases in decrements of −π/4 is performed for each symbol of a transmission-symbol sequence; the time domains of each symbol of the transmission-symbol sequence after phase rotation are compressed, then those symbols are repeated a specified number of times (L times), and the symbols of the obtained repetitive-symbol sequence are rearranged so that they have the same arrangement as the transmission-symbol sequence; phase rotation is performed that changes at a speed specific to the mobile station for each symbol of the rearranged repetitive-symbol sequence; and the phase-rotated symbols are transmitted, so it is possible to reduce PAPR of a transmission signal in the IFDMA modulation method, and by reducing the PAPR of a transmission signal, it is possible to use the transmission amplifier efficiently without the occurrence of distortion.

Also, with this invention, the amount of phase rotation that is performed for each symbol of the repetitive-symbol sequence changes in increments of k·2π/L (where k is an integer specific to the mobile station) at each period of the repetitive-symbol sequence, so it is possible to increase the amount of reduction of the PAPR of a transmission signal in the IFDMA modulation method, and it is possible to even more efficiently use the transmission amplifier without the occurrence of distortion.

Moreover, with the first frequency-division multiplexing receiving apparatus and receiving method of the present invention each symbol of a repetitive-symbol sequence that is transmitted is received, phase is generated that changes in increments of k·2π/L (where k is an integer specific to the mobile station) at each period of the repetitive-symbol sequence for each mobile station, phase rotation having that phase is performed for each received symbol of the repetitive-symbol sequence, components of identical symbols that are output from the phase-rotation unit are combined, and phase rotation that decreases in decrements of −π/4 or increases in increments of π/4 is performed for each symbol of the combined symbol sequence to demodulate the transmission symbols, so it is possible to accurately demodulate the transmission symbols that are transmitted using the transmission method described above.

With the second frequency-division multiplexing transmission apparatus and method of the present invention, phase rotation of π/4 or −π/4 is performed for the even-numbered or odd-numbered symbols of a transmission-symbol sequence; the time domains of each symbol of the transmission-symbol sequence after phase rotation are compressed, then those symbols are repeated a specified number of times (L times), and the symbols of the obtained repetitive-symbol sequence are rearranged so that they have the same arrangement as the transmission-symbol sequence; phase rotation is performed that changes at a speed specific to the mobile station for each symbol of the rearranged repetitive-symbol sequence; and the phase-rotated symbols are transmitted, so it is possible to reduce PAPR of a transmission signal in the IFDMA modulation method, and by reducing the PAPR of a transmission signal, it is possible to use the transmission amplifier efficiently without the occurrence of distortion.

Also, with this invention, the amount of phase rotation that is performed for each symbol of the repetitive-symbol sequence changes in increments of k·2π/L (where k is an integer specific to the mobile station) at each period of the repetitive-symbol sequence, so it is possible to increase the amount of reduction of the PAPR of a transmission signal in the IFDMA modulation method, and it is possible to even more efficiently use the transmission amplifier without the occurrence of distortion.

Moreover, with the second frequency-division multiplexing receiving apparatus and receiving method of the present invention each symbol of a repetitive-symbol sequence that is transmitted is received, phase is generated that changes in increments of k·2π/L (where k is an integer specific to the mobile station) at each period of the repetitive-symbol sequence for each mobile station, phase rotation having that phase is performed for each received symbol of the repetitive-symbol sequence, components of identical symbols that are output from the phase-rotation unit are combined, and phase rotation of −π/4 or π/4 is performed for the even-numbered or odd-numbered symbols to demodulate the transmission symbols, so it is possible to accurately demodulate the transmission symbols that are transmitted using the transmission method described above.

Other features and advantages of the present invention will be apparent from the following description taken in conjunction with the accompanying drawings.

BRIEF DESCRIPTION OF THE DRAWINGS

FIG. 1 is a drawing explaining the theory of the present invention.

FIG. 5 is a drawing explaining the amount of phase rotation that is performed for each symbol.

FIG. 9 is a drawing explaining the total amount of phase rotation performed for each respective symbol.

FIG. 16 is a drawing explaining the total amount of phase rotation that is performed for the symbols according to the embodiment.

DESCRIPTION OF THE PREFERRED EMBODIMENTS

When a channel encoded data sequence is encoded to I, Q complex components (symbols) in QPSK and transmitted, and when the symbol signal point in the IQ complex plane shown in (A) of FIG. 1 changes as $$(-1,-1) \to (1,1) \to (1,1) \to (-1,-1) \quad (A)$$

the peak of the transmission signal that is input to the transmission amplifier become large. In other words, when the signal point changes in a diagonal direction as described above, a peak occurs in the transmission signal. Symbol changes for which a peak occurs is not limited to the change described above and a peak will also occur in the case of the changes below.

$$(1,1) \to (-1,-1) \to (-1,-1) \to (1,1) \quad (B)$$

$$(1,-1) \to (-1,-1) \to (-1,1) \to (1,-1) \quad (C)$$

$$(-1,1) \to (1,-1) \to (1,-1) \to (-1,1) \quad (D)$$

(B) of FIG. 1 is a drawing explaining the change in the symbol point as given by (C) above. In other words, a peak occurs when the phase between adjacent symbols changes as $\pi \to 0 \to \pi$.

Therefore, in this invention, in order that the changes described above do not occur, the phase of the even or the odd symbols of the transmission symbol sequence is rotated by $\pi/4$ or $-\pi/4$, or, phase rotation is performed for each symbol of the transmission-symbol sequence by increasing the phase sequentially in increments of $\pi/4$ such as 0, $\pi/4$, $2\pi/4$, $3\pi/4$, . . . , or by decreasing the phase sequentially such as 0, $-\pi/4$, $-2\pi/4$, $-3\pi/4$, . . . . By doing so, the symbol point is prevented from changing as described in (A) to (D) above, the peak of the transmission signal is suppressed, and PAPR is decreased.

(A) First Embodiment

Figure 2:
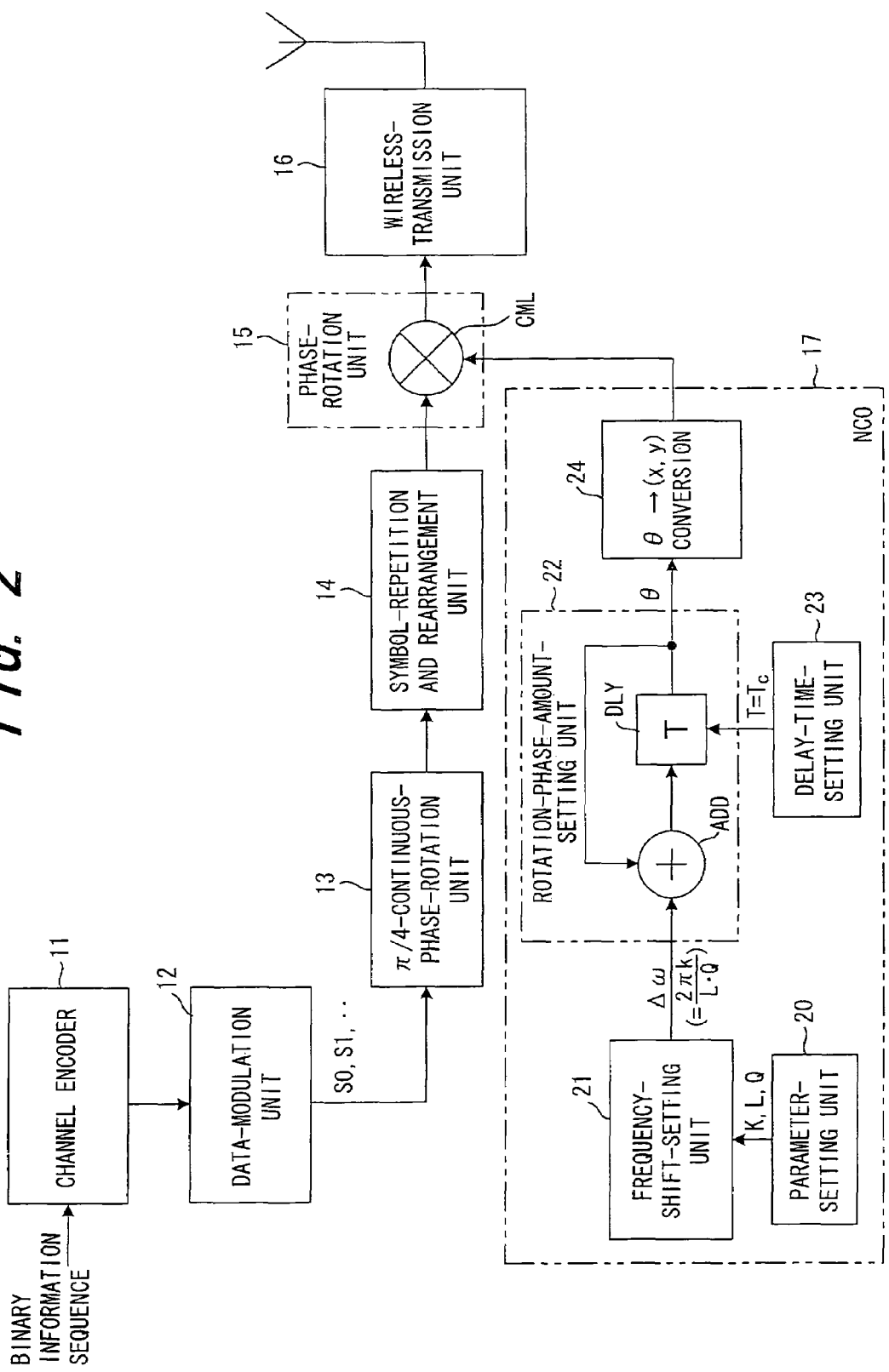
FIG. 2 is a block diagram of the frequency-division multiplexing transmission apparatus according to a first embodiment of the present invention.
Figure 3:
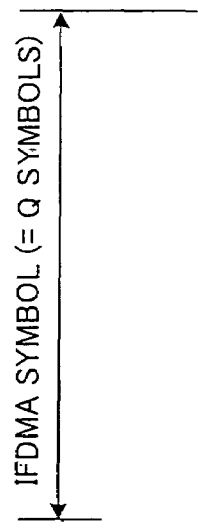
FIG. 3 is a drawing explaining the operation of the frequency-division multiplexing transmission apparatus.

FIG. 2 is a block diagram of the frequency-division multiplexing transmission apparatus of a first embodiment of the present invention, and FIG. 3 is a drawing explaining the operation of the frequency-division multiplexing transmission apparatus. The frequency-division multiplexing transmission apparatus of this first embodiment can be used as a mobile station.

A channel encoder 11 performs channel encoding by applying error-correction encoding such as turbo encoding, or convolutional encoding to the input binary information sequence, and a data-modulation unit 12 converts the channel-encoded data sequence to I, Q complex components (symbols) in QPSK, for example. As shown in (a) of FIG. 3, one IFDMA symbol is composed of Q-number of symbols S0, S1 (S2, S3) (Q=2 in the figure).

A $\pi/4$-continuous-phase-rotation unit 13 performs phase rotation that increases in $\pi/4$ increments (0, $\pi/4$, $2\pi/4$, $3\pi/4$, . . . ) for each input symbol (see (b) of FIG. 3). The symbol ' is given to symbols for which phase rotation has been performed. A symbol-repetition and rearrangement unit 14 compresses the time domains of the two symbols S0, S1' (S2', S3') of the IFDMA symbol, then repeatedly generates each symbol L times (L=4 in the figure) and rearranges that repetitive symbol sequence so that it has the same arrangement as the symbol sequence S0, S1' (S2', S3') (see (c) of FIG. 3). By taking Tc to be the sample period, the symbol sequence will be repeated at the period Ts=Tc×Q.

A phase-rotation unit 15 has a complex multiplier CML that performs phase rotation specific to the mobile station on each symbol of the repetitive-symbol sequence, and a wireless-transmission unit 16 performs up-conversion of the frequency of the signal input from the phase-rotation unit 15 from a baseband frequency to a radio frequency, then amplifies and transmits the signal from an antenna.

A numerically controlled oscillator (NCO) 17 calculates the amount of phase rotation θ per unit time Tc, and the complex multiplier CML of the phase-rotation unit 15 performs phase rotation specific to the mobile station for each symbol of the repetitive-symbol sequence and executes processing to shift the frequency. The phase $\theta_k(t)$ that is output from the NCO 17 when repeating Q-number of symbols L times is given by Equation (1). The NCO 17 has a frequency-shift-setting unit 21 that uses the parameters k, L and Q for calculating and setting the amount of change in phase rotation per unit time Tc (angular speed) Δω using Equation (2) and outputs the result. A rotation-phase-amount-setting unit 22 comprises a delay unit DLY, which applies a delay time T (=Tc) that is set by a delay-time-setting unit 23, and an adder ADD, and by performing the operation of Equation (3) for each unit time T, increases the amount of phase rotation θ in increments of Δω and outputs the result. A converter 24 calculates the I, Q components (x, y) in the complex plane of the amount of the phase rotation amount θ, and inputs these components to the phase-rotation unit 15. With S (=X+jY) as the symbols of the repetitive-symbol sequence, the phase-rotation unit 15 performs the calculation (X+jY)·(x+jy), and outputs the calculation results. In actuality, the complex multiplier CML of the phase rotation unit 15 calculates (Xx−Yy), (Xy+Yx) for each real-number and imaginary number part.

In this first embodiment, even when the phase between adjacent symbols changes as π→0→π, the phase rotation is increased in increments of π/4 for each symbol, so it is possible to prevent the signal point from changing as π→0→π, and it is possible to suppress the peak and reduce PAPR.

(B) Second Embodiment

In the first embodiment, PAPR was reduced by increasing the phase rotation in increments of π/4 for each symbol, and frequency shifting specific to the mobile station was also performed by the phase-rotation unit 15. Therefore, depending on the frequency specific to the mobile station, there may be cases in which it is not possible to reduce PAPR. In order to explain these cases, FIG. 4 is a drawing explaining the operation of the frequency-division multiplexing transmission apparatus of the first embodiment, where (a) to (c) of FIG. 4 are the same as (a) to (c) of FIG. 3.

Figure 4:
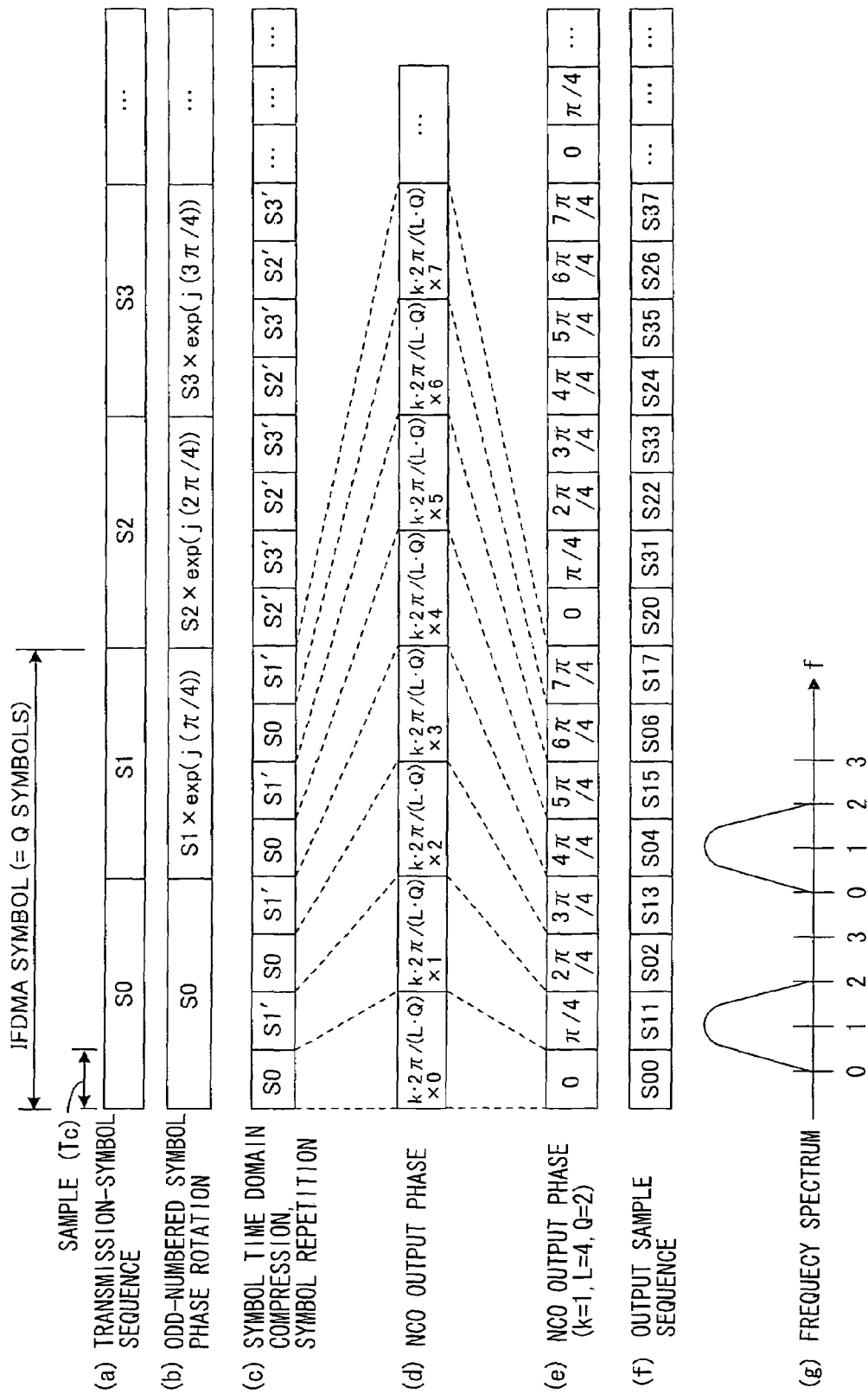
FIG. 4 is a drawing explaining the case when it is not possible to reduce the PAPR by a frequency specific to a mobile station.

The amount of phase rotation θ that is performed for each symbol of the repetitive-symbol sequence is given by Equation (3) (see (d) of FIG. 4). With k=1, L=4 and Q=2, the phase-rotation unit 15 performs phase rotation that increases sequentially in increments of π/4 for each symbol. As a result, the amount of phase rotation for each symbol S00, S11, S02, S13, S04, S15, S06, S17 is as shown in (e) of FIG. 4, and the frequency spectrum becomes as shown in (g).

From the above, the total amount of phase rotation that is performed for each symbol S00, S11, S02, S13, S04, S15, S06, S17 by both the π/4-continuous-phase-rotation unit 13 and the phase-rotation unit 15 is as shown in FIG. 5. As is clearly seen from FIG. 5, the amount of phase rotation performed for each symbol is an integer multiple of π/2. Therefore, depending on the combination of transmission symbols, the phase between adjacent symbols changes as π→0→π, a peak occurs and it is not possible to effectively reduce PAPR.

Figure 6:
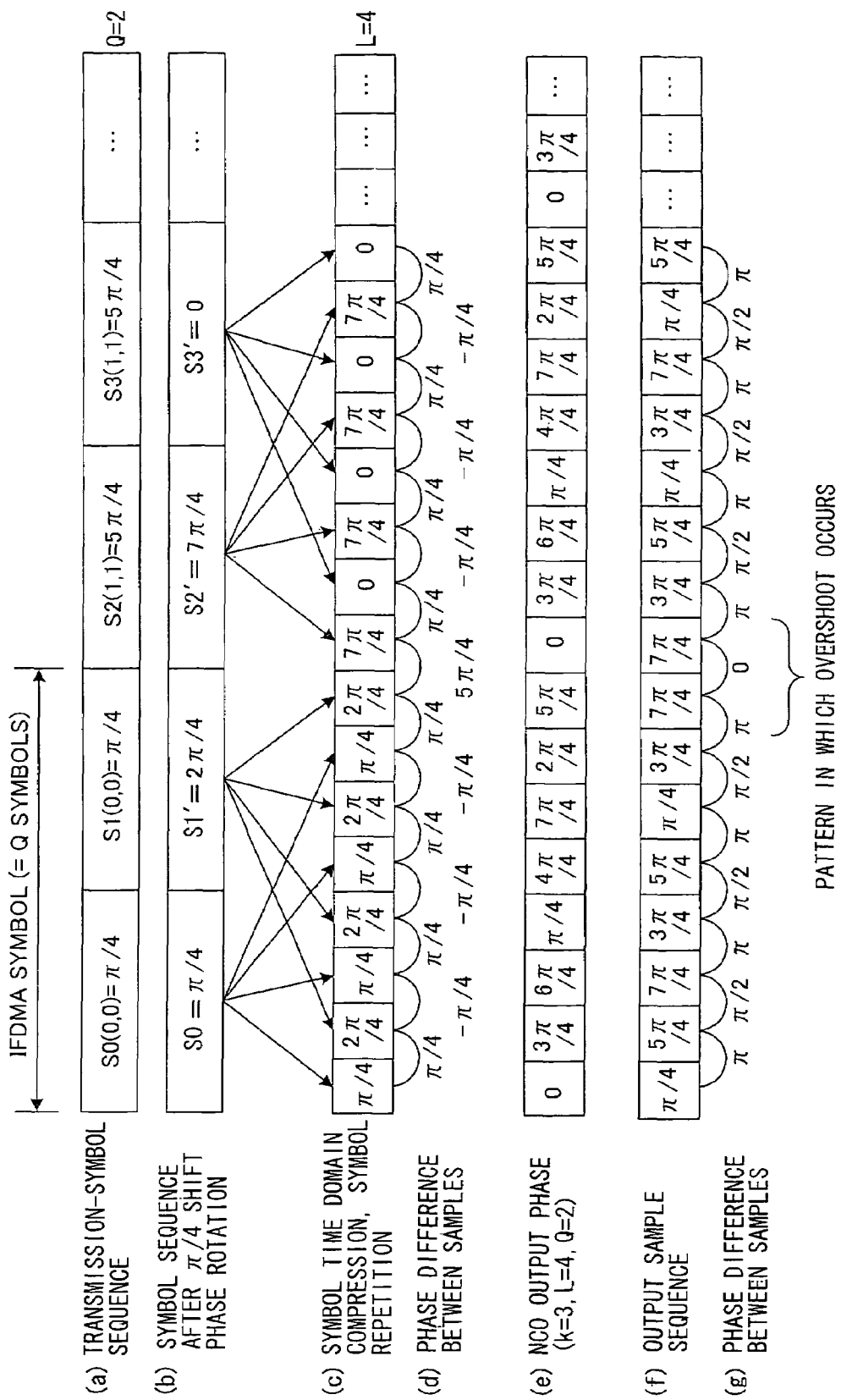
FIG. 6 is a drawing explaining in detail the case in which changes occur to any one of the signal points (A) to (D) explained in FIG. 1 of this first embodiment.

FIG. 6 is a drawing explaining the case in the first embodiment when the phase between adjacent symbols changes as π→0→π. As shown in (a) of FIG. 6, when transmission symbol S0 is (0,0) (=π/4), transmission symbol S1 is (0,0) (=π/4), transmission symbol S2 is (1,1) (=5π/4) and transmission symbol S3 is (1,1) (=5π/4), etc., the π/4-continuous-phase-rotation unit 13 performs phase rotation of 0, π/4, 2π/4, 3π/4, etc. on each respective symbol, so the phase of the signal point of each symbol becomes π/4, 2π/4, 7π/4, 0, . . . as shown in (b) of FIG. 6.

The symbol-repetition and rearrangement unit 14 compresses the time domains of each of the transmission symbols S0, S1', S2', S3', . . . , and together with repeating each symbol 4 times, rearranges the symbols (see (c) of FIG. 6). When k=3, L=4 and Q=2, the phase-rotation unit 15 performs phase rotation specific to the mobile station for each symbol of the repetitive-symbol sequence as shown in (e) of FIG. 6. As a result, the phase of each symbol of the repetitive-symbol sequence that is input to the wireless-transmission unit 16 becomes as shown in (f) of FIG. 6, and a pattern occurs in which the phase of the signal point changes as π→0→π, and a peak (overshoot) occurs.

Taking the above into consideration, in the second embodiment, the phase-rotation unit 15 changes the amount of phase rotation performed for each symbol of the repetitive-symbol sequence in increments of k·2π/L at the period Ts (=Tc×Q) of the repetitive-symbol sequence. Here, k is an integer specific to the mobile station. By doing this, the frequency spectrum is changed by k, and the total amount of phase rotation that is performed for each symbol of the repetitive-symbol sequence S00, S11, S02, S13, S04, S15, S06, S17 (see (f) of FIG. 4) is prevented from becoming an integer multiple of π/2, and the phase between adjacent symbols is prevented from changing as π→0→π.

(a) Frequency-Division Multiplexing Transmission Apparatus

Figure 7:
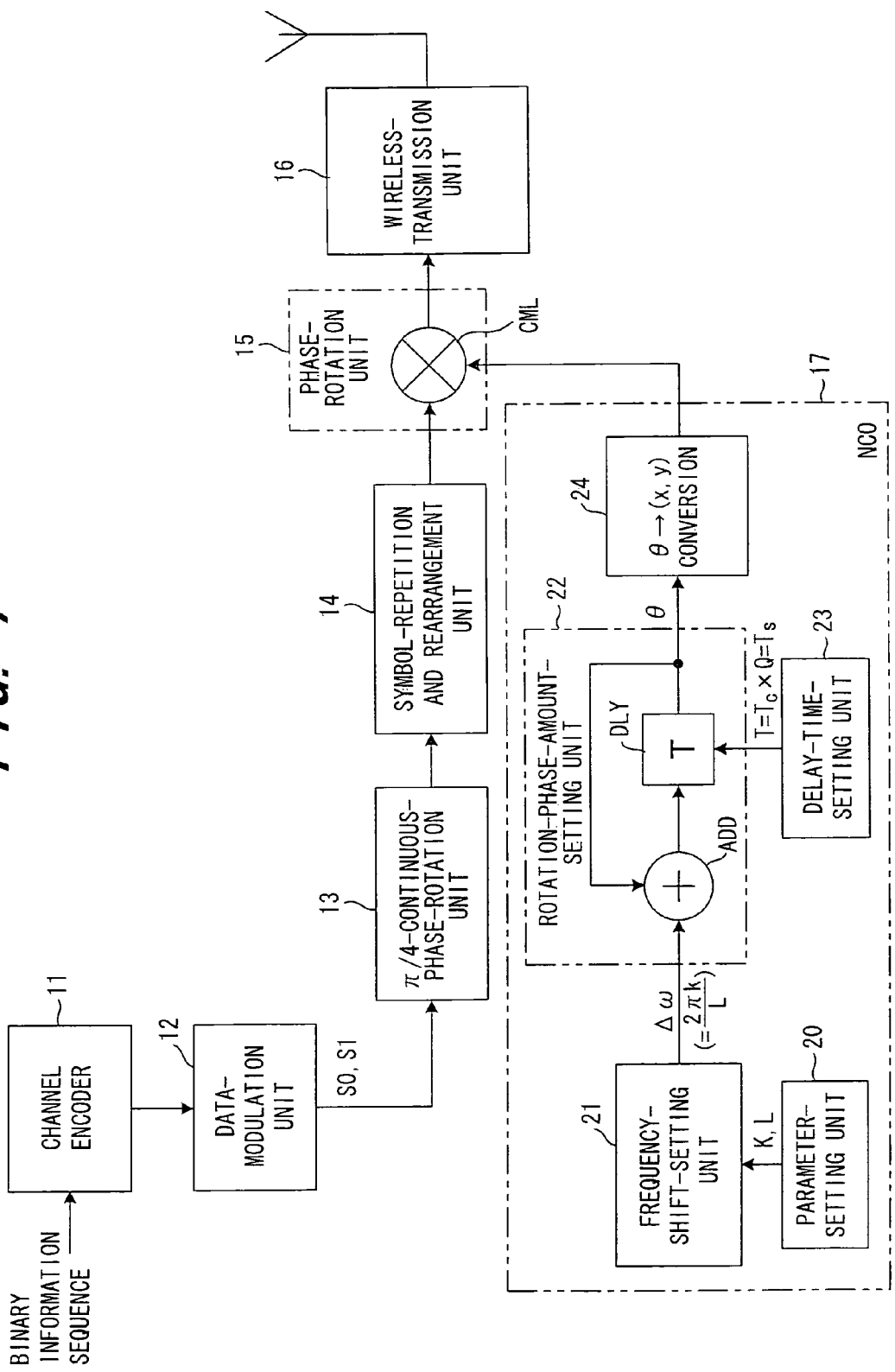
FIG. 7 is a block diagram of the frequency-division multiplexing transmission apparatus according to a second embodiment of the present invention.
Figure 8:
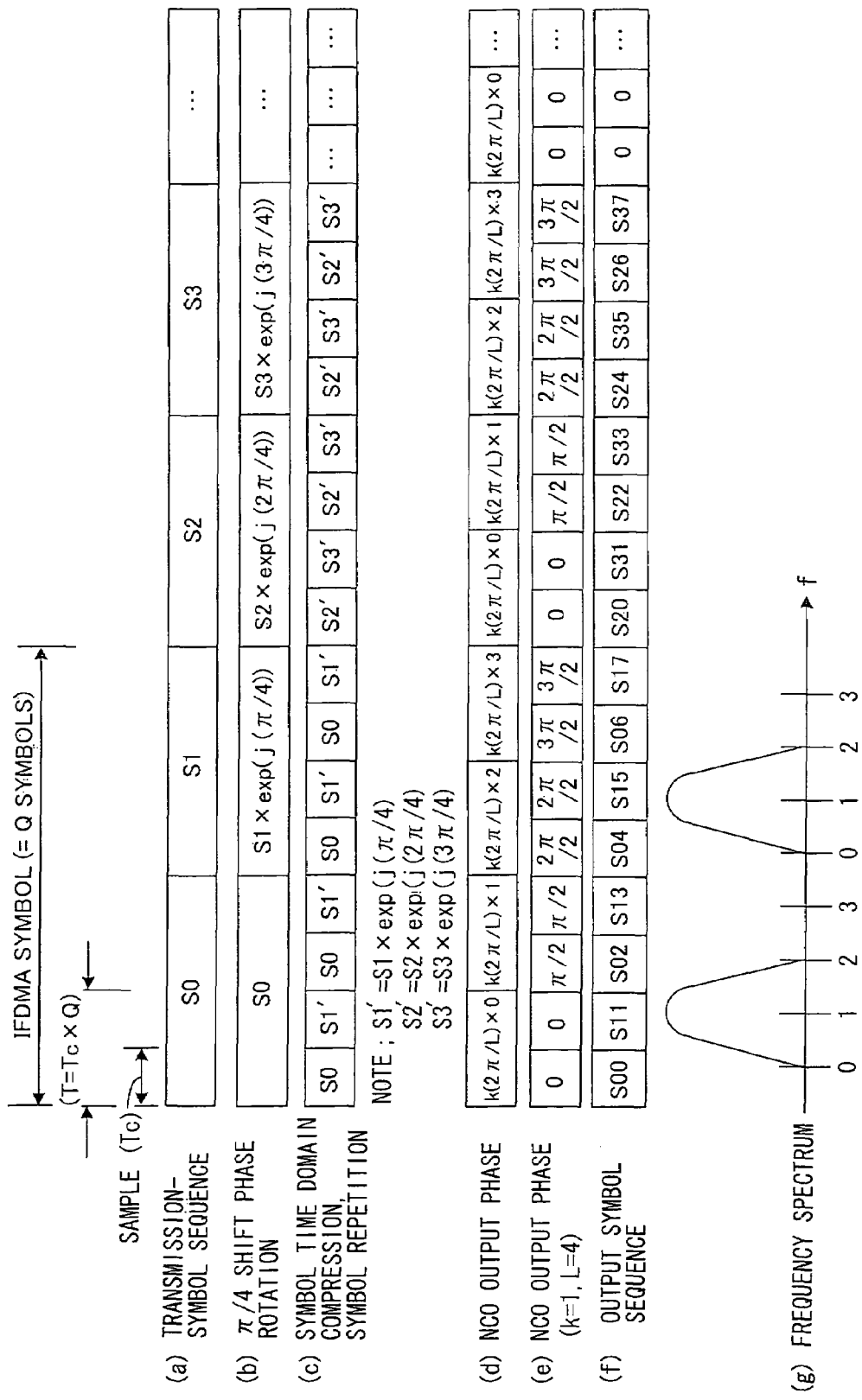
FIG. 8 is a drawing explaining the operation of the frequency-division multiplexing transmission apparatus.

FIG. 7 is a block diagram of the frequency-division multiplexing transmission apparatus of a second embodiment of the present invention, and FIG. 8 is a drawing explaining the operation of the frequency-division multiplexing transmission apparatus, where the same reference numbers are applied to parts that are the same as in the first embodiment. This embodiment differs in that the NCO (Numerical Controlled Oscillator) 17 calculates the amount of phase rotation θ for every period Ts (=Tc×Q) of the repetitive-symbol sequence, and the complex multiplier CML of the phase-rotation unit 15 performs rotation of that amount θ for each symbol of the repetitive-symbol sequence and performs frequency-shift processing. The phase θ$_k$(t) that is output from the NCO 17 is given by the equation below.

$$\theta_k(t) = k \cdot 2\pi \frac{W}{L} \cdot t = k \cdot 2\pi \frac{1}{L \cdot Ts} \cdot t \quad (4)$$

Here, k is a value that corresponds to the mobile station, and is any one value among 0, 1, 2, . . . , L−1, and W=1/Ts. Therefore, the phase θ that is output from the NCO 17 in increased in increments of k·2π/L at each period Ts (=Tc×Q) of the repetitive-symbol sequence, and the IFDMA period (=4Ts) forms one cycle.

The channel encoder 11 performs channel encoding by applying error-correction encoding such as turbo encoding, or convolutional encoding to the input binary information sequence, and the data-modulation unit 12 converts the channel-encoded data sequence to I, Q complex components (symbols) in QPSK, for example. As shown in (a) of FIG. 8, one IFDMA symbol is composed of Q-number of symbols S0, S1 (S2, S3) (Q=2 in the figure).

A π/4-continuous-phase-rotation unit 13 performs phase rotation that increases in increments of π/4 (0, π/4, 2π/4, 3π/4, . . . ) for each input symbol (see (b) of FIG. 8). The symbol ' is given to symbols for which phase rotation has been performed. The symbol-repetition and rearrangement unit 14 compresses the time domains of the two symbols S0, S1' (S2', S3') of the IFDMA symbol, then repeatedly generates each symbol L times (L=4 in the figure) and rearranges that repetitive-symbol sequence so that it has the same arrangement as the symbol sequence S0, S' (S2', S3') (see (c) of FIG. 8).

The complex multiplier CML of the phase-rotation unit 15 performs phase rotation specific to the mobile station for each symbol of the repetitive-symbol sequence. More specifically, the phase-rotation unit 15 changes the amount of phase rotation performed for each symbol in increments of k·2π/L at each period Ts (=Q×Tc) of the repetitive-symbol sequence as shown in (d) of FIG. 8. Here, k is an integer that is specific to the mobile station, and is any one value among 0, 1, 2, . . . , L−1. The wireless-transmission unit 16 performs up-conversion of the frequency of the signal that is input from the phase-rotation unit 15 from a baseband frequency to a radio frequency, after which it amplifies the signal and transmits it from an antenna.

Figure 20:
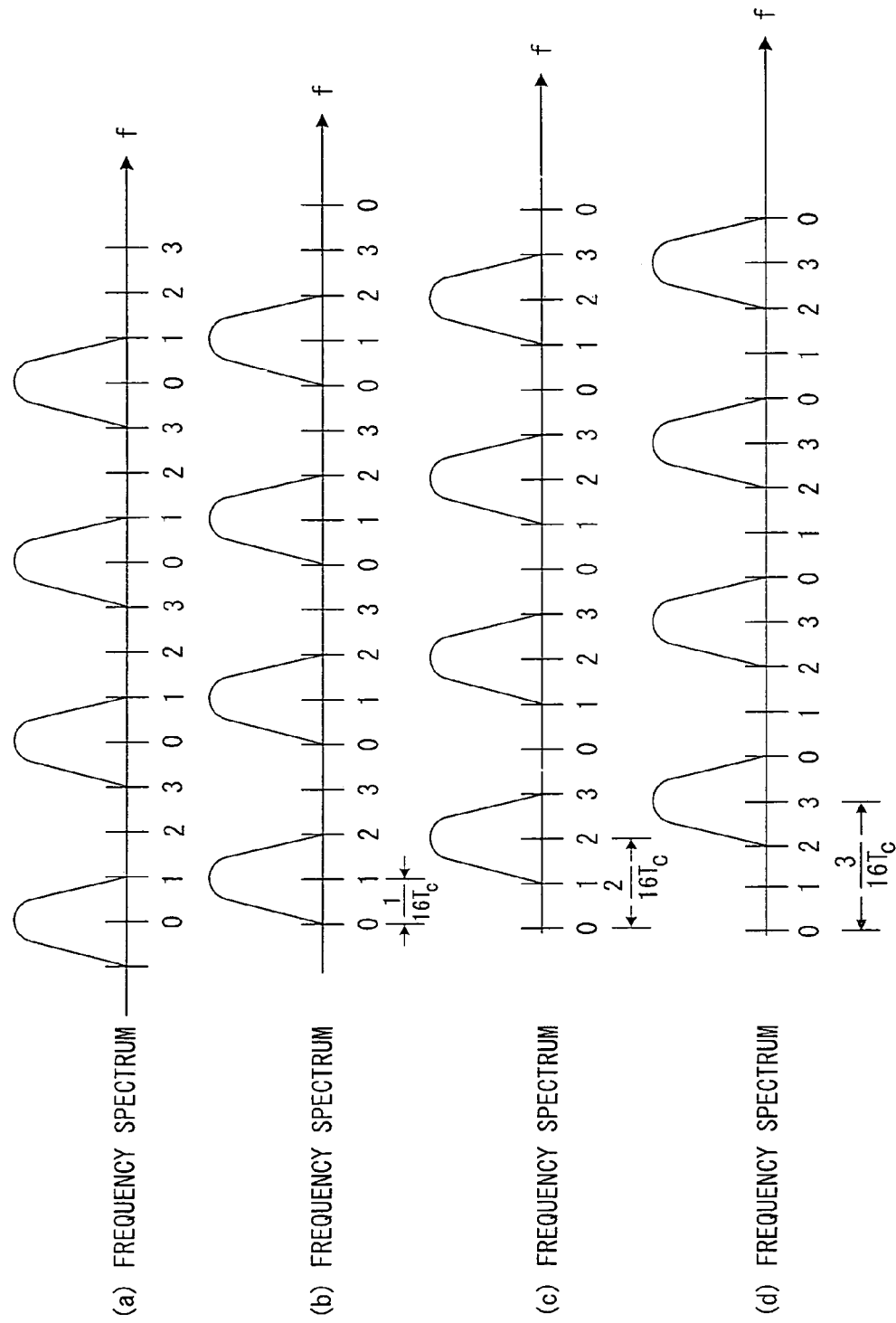
FIG. 20 is a drawing explaining frequency spectrum.
Figure 21:
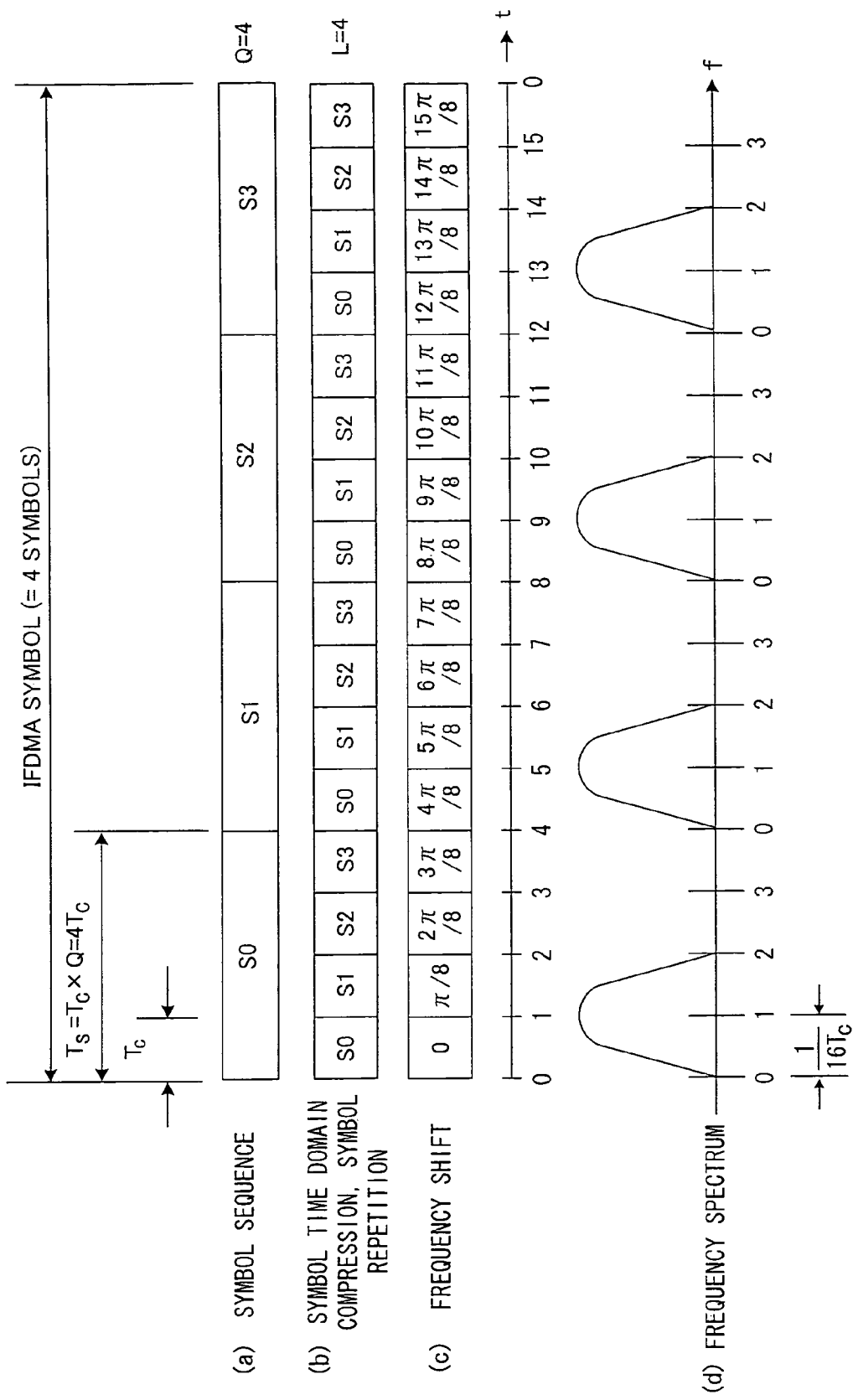
FIG. 21 is a drawing explaining the amount of phase rotation performed by a phase-rotation unit for each symbol of a repetitive-symbol sequence.
Figure 22:
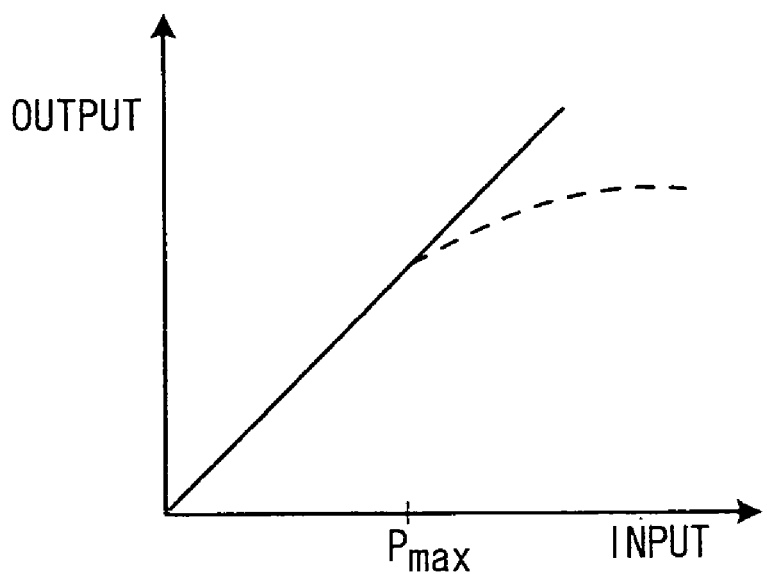
FIG. 22 is a drawing showing the input/output characteristics of a transmission amplifier.

As shown in (a) to (d) of FIG. 8, by compressing the time domains of each of the symbols S0, S1 of the transmission-symbol sequence, then repeating the symbols a specified number of times (L=4) and rearranging each of the symbols of the repetitive-symbol sequence so that they have the same arrangement as the symbol sequence S0, S1, a comb-tooth-shaped frequency spectrum occurs (see (g) of FIG. 8). By performing phase rotation that changes in increments of $k\cdot 2\pi/L$ at each period Ts (=Q×Tc) of the repetitive-symbol sequence for each symbol of the repetitive-symbol sequence, the spectral position of the comb-tooth-shaped frequency spectrum is dependent on k and shifts in the same way as shown in FIG. 20.

In the NCO 17, the parameter-setting unit 20 sets k and L, which were obtained by notification from the base station, in a frequency-shifting unit 21, the frequency-shifting unit 21 then uses the parameters k, L to calculate the amount of change in phase rotation per period Ts of the repetitive-symbol sequence $\Delta\omega$ (=$k\cdot 2\pi/L$), and outputs the result. The rotation-phase-amount-setting unit 22 comprises an adder ADD and a delay unit DLY that applies a delay time T (=Tc×Q), and it performs the calculation $$\theta=\theta+\Delta\omega$$

at each period Ts of the repetitive-symbol sequence, increases the amount of phase rotation $\theta$ in increments of $\Delta\omega$, and outputs the result (see (d) of FIG. 8). The delay-time-setting unit 23 sets the period Ts (=Tc×Q) of the repetitive-symbol sequence as the delay time T for the delay unit DLY. The converter 24 calculates the I, Q components (x, y) in the complex plane of the amount of the phase rotation amount $\theta$, and inputs these components to the phase-rotation unit 15. When k=1, the amount of phase rotation $\theta$ changes in increments of $\pi/2$ at each period Ts (see (e) of FIG. 8), and the frequency spectrum becomes as shown in (g) of FIG. 8.

The complex multiplier CML of the phase-rotation unit 15 performs calculation according to the equation $$(X+jY)\times(x+jy)$$

with the symbols of the repetitive-symbol sequence represented by S (=X+jY), and outputs the calculation results. In actuality, the complex multiplier calculates and outputs (Xx−Yy), (Xy+Yx) for every real-number and imaginary part.

In the frequency-division multiplexing transmission apparatus of this second embodiment, with k=1, L=4 and Q=2, the phase-rotation unit 15 performs phase rotation for each symbol of the repetitive-symbol sequence S00, S11, S02, S13, S04, S15, S06, S17 as shown in (e) of FIG. 8. As a result, the total amount of phase rotation performed by both the $\pi/4$-continuous-phase-rotation unit 13 and phase-rotation unit 15 for each symbol S00, S11, S02, S13, S04, S15, S06, S17 becomes as shown in FIG. 9. As can be clearly seen from FIG. 9, the amount of phase rotation performed for each symbol is an integer multiple of $\pi/4$. As a result, with this second embodiment, the phase between adjacent symbols does not change as $\pi\rightarrow 0\rightarrow \pi$, it is possible to suppress a peak, and it is possible to effectively reduce PAPR.

(b) Frequency-Division Receiving Apparatus

Figure 10:
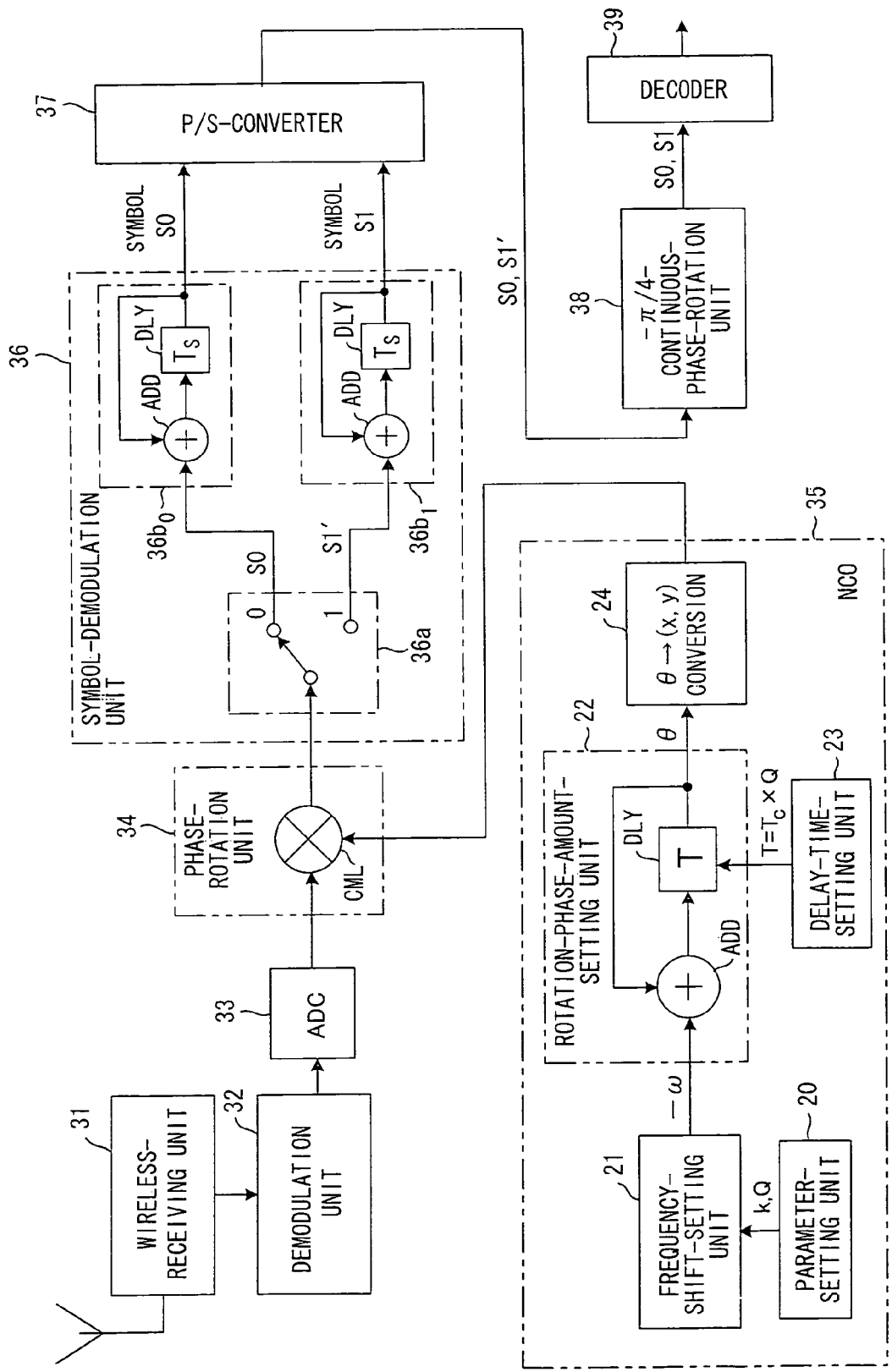
FIG. 10 is a block diagram of the frequency-division multiplexing receiving apparatus.

FIG. 10 is a block diagram of a frequency-division multiplexing receiving apparatus, and this frequency-division multiplexing receiving apparatus can be used as a base station.

A wireless-receiving unit 31 receives a wireless signal, and performs down-conversion of the frequency to a baseband signal, after which a QPSK-demodulation unit 32 performs QPSK demodulation of the baseband signal, and an AD converter 33 converts the demodulated result (symbols) to a digital signal and inputs it to a phase-rotation unit 34. An NCO 35 has construction similar to that of the NCO 17 of the frequency-division multiplexing transmission apparatus, and performs the calculation of the equation $$\theta=\theta-\Delta\omega \quad (5)$$

at each period Ts (=Tc×Q) of the repetitive-symbol sequence, and performs phase rotation in the opposite direction of transmission, or in other words, decreases the amount of phase rotation O in decrements of $-\Delta\omega$.

A complex multiplier CML in the phase-rotation unit 34 performs phase rotation of the symbols input from the AD converter 33 according to the amount of phase rotation $\theta$ that is calculated using Equation (5) to restore the signal to its original phase, and inputs the generated repetitive-symbol sequence as shown in (c) of FIG. 8 to a symbol-demodulation unit 36. The symbol-demodulation unit 36 integrates the symbols S0 of the repetitive-symbol sequence to demodulate the transmission symbols S0, and integrates the symbols S1' of the repetitive-symbol sequence to demodulate the transmission symbols transmission symbol S1'. In other words, a switch 36a of the symbol-demodulation unit 36 switches output terminals 0 to 1 at the sample period Tc, and an integrator $36b_0$ for symbols S0 integrates the repetitive symbols S0 to demodulate the transmission symbols S0, and similarly, an integrator $36b_1$ for symbols S1' integrates the repetitive symbols S1' to demodulate the transmission symbols S1'. Demodulation is similarly performed for the next transmission symbols S2', S3', . . . .

A parallel-to-serial converter 37 converts the transmission symbols S0, S1' (S2', S3', . . . ) to series and transmits the result, and a $-\pi/4$-continuous-phase-rotation unit 38 performs phase rotation that decreases in decrements of $-\pi/4$(0, $-\pi/4, -2\pi/4, -3\pi/4, \ldots$) for each input symbol to restore them to their original phase S0, S1 (S2, S3) and inputs the symbols to a decoder 39, which performs an error-correction-decoding process for each of the input symbols S0, S1 (S2, S3), and inputs the result to a data-processing unit (not shown in the figure).

In FIG. 10, construction is shown for only one mobile station, however, there is a phase-rotation unit 34, NCO 35 and symbol-demodulation unit 36 for each mobile station.

With the frequency-division multiplexing receiving apparatus described above, it is possible to accurately demodulate the transmission symbols that were transmitted from the frequency-division multiplexing transmission apparatus of the second embodiment.

(C) Third Embodiment

Figure 11:
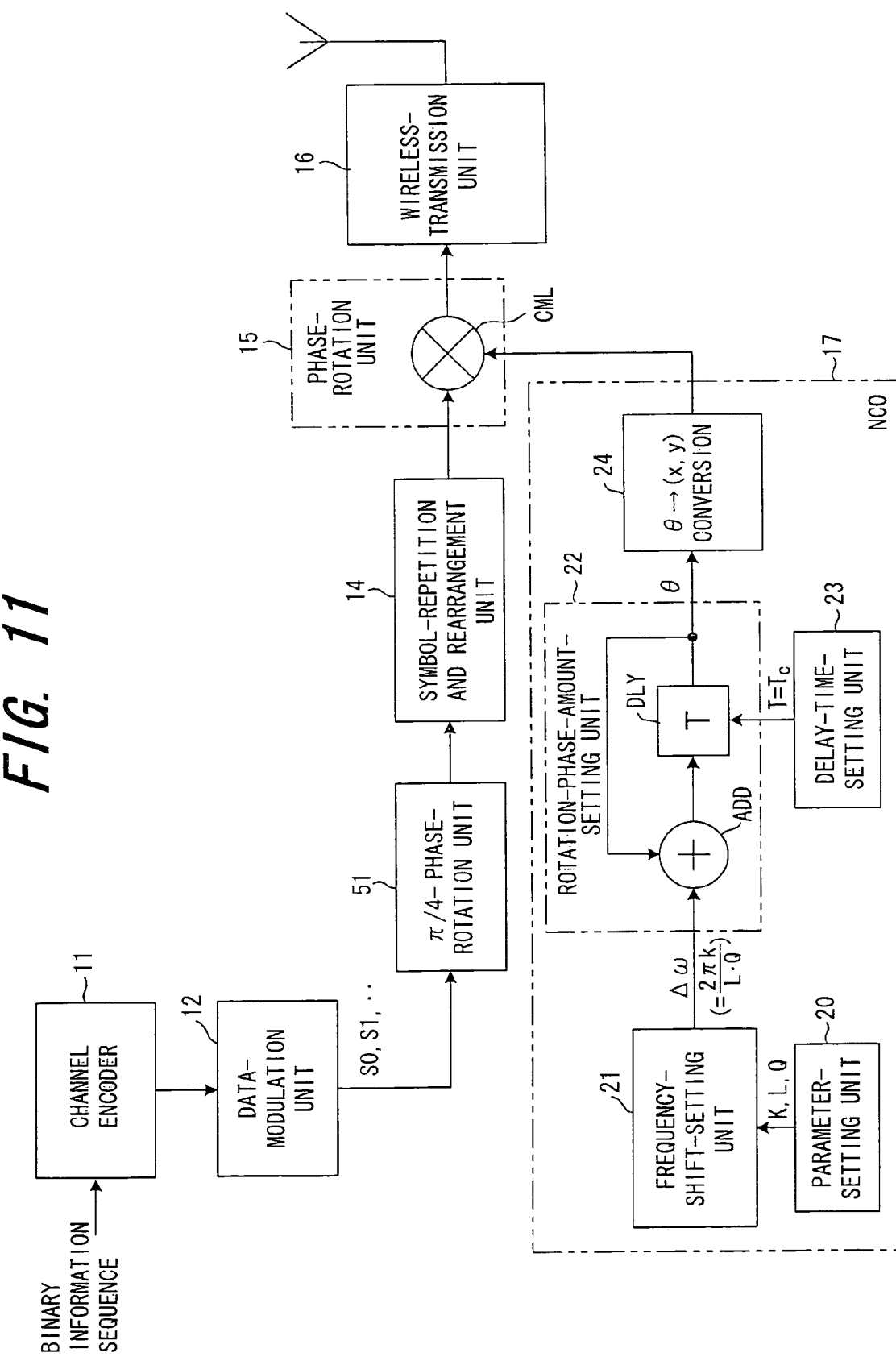
FIG. 11 is a block diagram of the frequency-division multiplexing transmission apparatus according to a third embodiment of the present invention.
Figure 12:
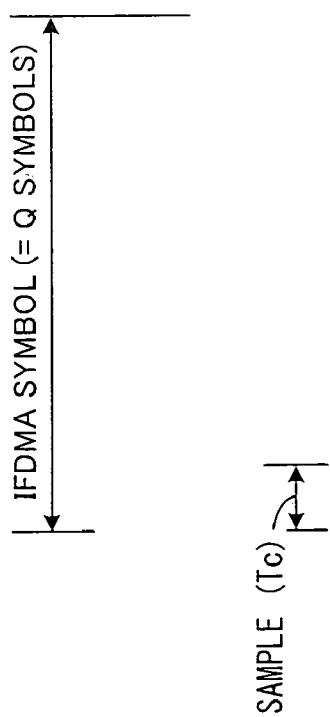
FIG. 12 is a drawing explaining the operation of the frequency-division multiplexing transmission apparatus.

FIG. 11 is a block diagram of the frequency-division multiplexing transmission apparatus of a third embodiment of the present invention, and FIG. 12 is a drawing explaining the operation of the frequency-division multiplexing transmission apparatus. In the frequency-division multiplexing transmission apparatus shown in FIG. 11, the same reference numbers are given to parts that are the same as those of the first embodiment shown in FIG. 2. This embodiment differs in that, in the first embodiment, the $\pi/4$-continuous-phase-rotation unit 13 performed phase rotation that increased in increments of $\pi/4$ for each input symbol, however, in this third embodiment, a π/4-phase-rotation unit 51 rotates the phase of even-numbered or odd-numbered symbols by π/4 or −π/4 as shown in (b) of FIG. 12.

A channel-encoder 11 performs channel encoding by applying error-correction encoding such as turbo encoding, or convolutional encoding to the input binary information sequence, and a data-modulation unit 12 converts the channel-encoded data sequence to I, Q complex components (symbols) in QPSK, for example. As shown in (a) of FIG. 12, one IFDMA symbol is composed of Q-number of symbols S0, S1 (S2, S3) (Q=2 in the figure).

The π/4-phase-rotation unit 51 rotates the phase of even-numbered or odd-numbered symbols by π/4 or −π/4 (in (b) of FIG. 12, the phase of the odd numbered symbols are rotated by π/4), and a symbol-repetition and rearrangement unit 14 compresses the time domains of the two symbols S0, S1' (S2, S3') of the IFDMA symbol, then repeats each of the symbols L times (L=4 in the figure) and rearranges the repetitive-symbol sequence so that it has the same arrangement as the symbol sequence S0, S1' (S2, S3') (see (c) of FIG. 12). The odd numbered symbols S1, S3, S5, . . . which have undergone a π/4 phase rotation are represented by the symbols S1', S3', S5' . . . . A complex multiplier CML in a phase-rotation unit 15 performs phase rotation specific to the mobile station for each symbol of the repetitive-symbol sequence, and a wireless-transmission unit 16 performs up-conversion of the frequency that is input from the phase-rotation unit 15 from a baseband frequency to a radio frequency, then amplifies the signal and transmits it from an antenna.

A numerically controlled oscillator (NCO) 17 calculates the amount of phase rotation θ per unit time Tc, and the complex multiplier CML of the phase-rotation unit 15 performs phase rotation specific to the mobile station for each symbol of the repetitive-symbol sequence and executes processing to shift the frequency. The phase $\theta_k(t)$ that is output from the NCO 17 when repeating Q-number of symbols L times is given by Equation (1). The NCO 17 has a frequency-shift-setting unit 21 that uses the parameters k, L and Q for calculating and setting the amount of change in phase rotation per unit time Tc (angular speed) Δω using Equation (2) and output the result. A rotation-phase-amount-setting unit 22 comprises a delay unit DLY, which applies a delay time T (=Tc) that is set by a delay-time-setting unit 23, and an adder ADD, and by performing the operation of Equation (3) for each unit time T, increases the amount of phase rotation θ in increments of Δω and outputs the result. A converter 24 calculates the I, Q components (x, y) in the complex plane of the amount of the phase rotation amount θ, and inputs these components to the phase-rotation unit 15. With S (=X+jY) as the symbols of the repetitive-symbol sequence, the phase-rotation unit 15 performs the calculation $$(X+jY) \times (x+jy)$$

and outputs the calculation results.

In this third embodiment, even when the phase between adjacent symbols changes as π→0→π, the phase of the even numbered or odd numbered symbols is rotated by π/4 or −π/4, so it is possible to prevent the signal point from changing as π→0→π, and it is possible to suppress the peak and reduce PAPR.

(D) Fourth Embodiment

Figure 13:
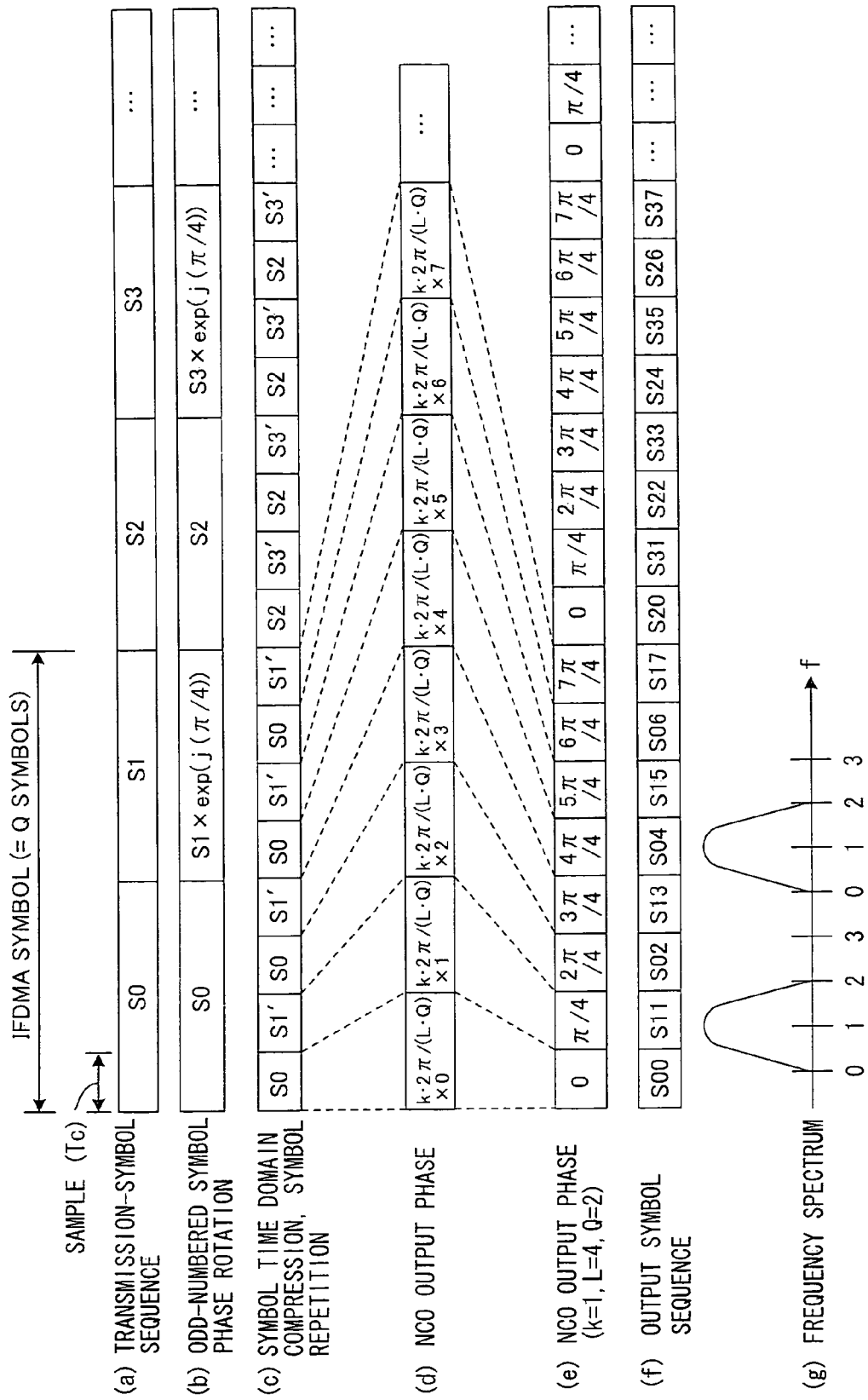
FIG. 13 is a drawing explaining the case when it is not possible to reduce the PAPR in dependence upon a frequency specific to a mobile station.

In the third embodiment, the phase of the even numbered or odd numbered symbols was rotated by π/4 or −π/4 in order to reduce the PAPR, however, frequency shift specific to the mobile station is performed by the phase-rotation unit 15 as well. Therefore, there are cases in which, depending on the frequency specific to the mobile station, it may not be possible to reduce the PAPR. FIG. 13 is a drawing explaining the operation of the frequency-division multiplexing transmission apparatus of the third embodiment for these cases, where (a) to (c) of FIG. 13 are the same as (a) to (c) of FIG. 12.

The amount of phase rotation θ that is performed for each symbol of the repetitive-symbol sequence is given by Equation (3) (see (d) of FIG. 13). When k=1, L=4 and Q=2, the phase-rotation unit 15 performs phase rotation that successively increases in increments of π/4 for each symbol. As a result, the amount of phase rotation for each of the symbols S00, S11, S02, S13, S04, S15, S06, S17 becomes as shown in (e) of FIG. 13, and the frequency spectrum becomes as shown in (g) of FIG. 13.

From this, the total amount of phase rotation that is performed by both the π/4-phase-rotation unit 51 and the phase-rotation unit 15 for each symbols S00, S11, S02, S13, S04, S15, S06, S17 becomes as shown in FIG. 5. As can be clearly seen from FIG. 5, depending on the combination of transmission symbols, the case occurs in which the phase between adjacent symbols changes as π→0→π, a peak occurs, and it is not possible to effectively reduce PAPR.

Taking the above into consideration, in the fourth embodiment, the phase-rotation unit 15 changes the amount of phase rotation performed for each symbol of the repetitive-symbol sequence in increments of k·2π/L at the period Ts (=Tc×Q) of the repetitive-symbol sequence. Here, k is an integer specific to the mobile station. By doing this, the frequency spectrum is changed by k, and the total amount of phase rotation that is performed for each symbol of the repetitive-symbol sequence S00, S11, S02, S13, S04, S15, S06, S17 (see (f) of FIG. 13) is prevented from becoming an integer multiple of π/2, and the phase between adjacent symbols is prevented from changing as π→0→π.

(a) Frequency-Division Multiplexing Transmission Apparatus

Figure 14:
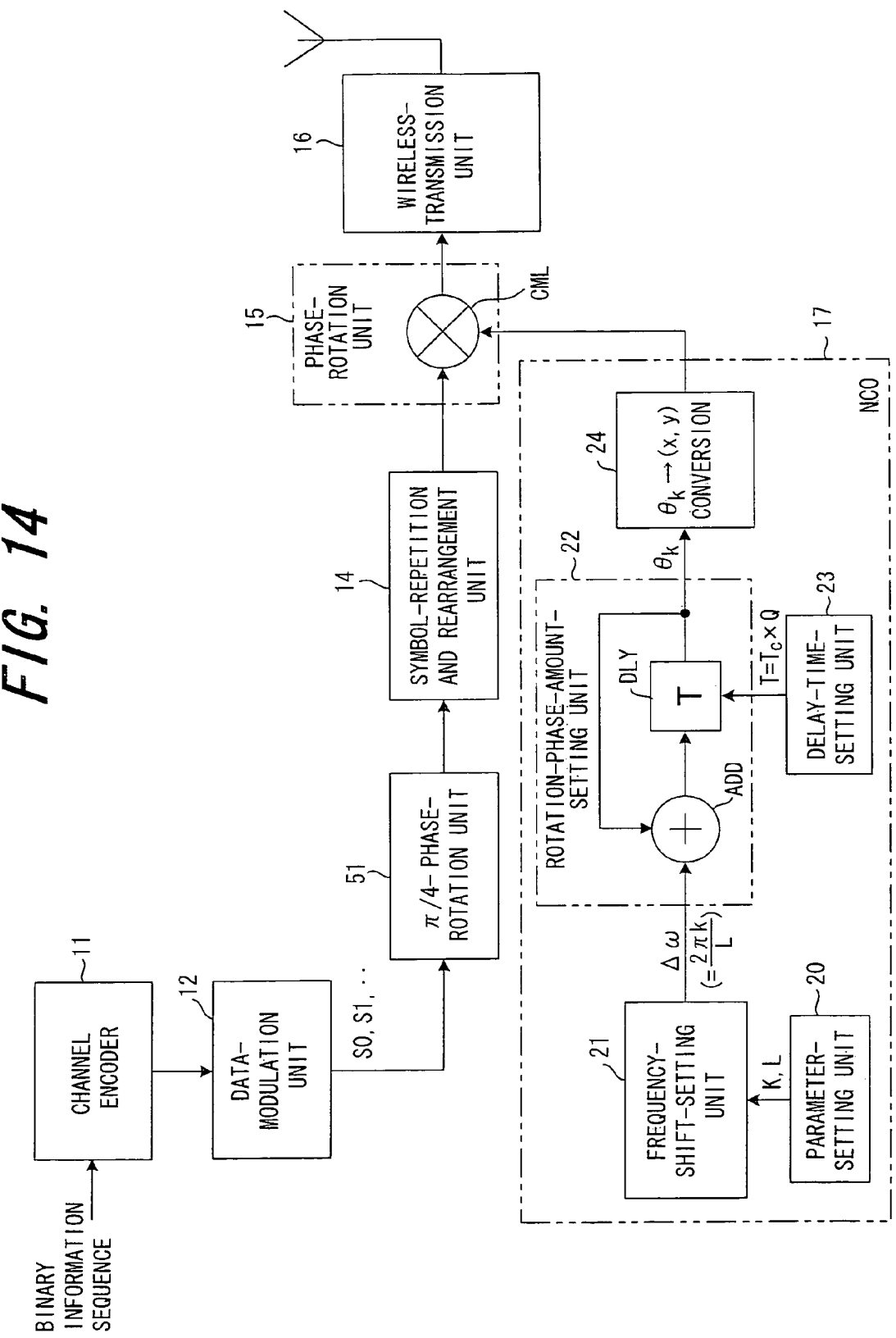
FIG. 14 is a block diagram of the frequency-division multiplexing transmission apparatus according to a fourth embodiment of the present invention.
Figure 15:
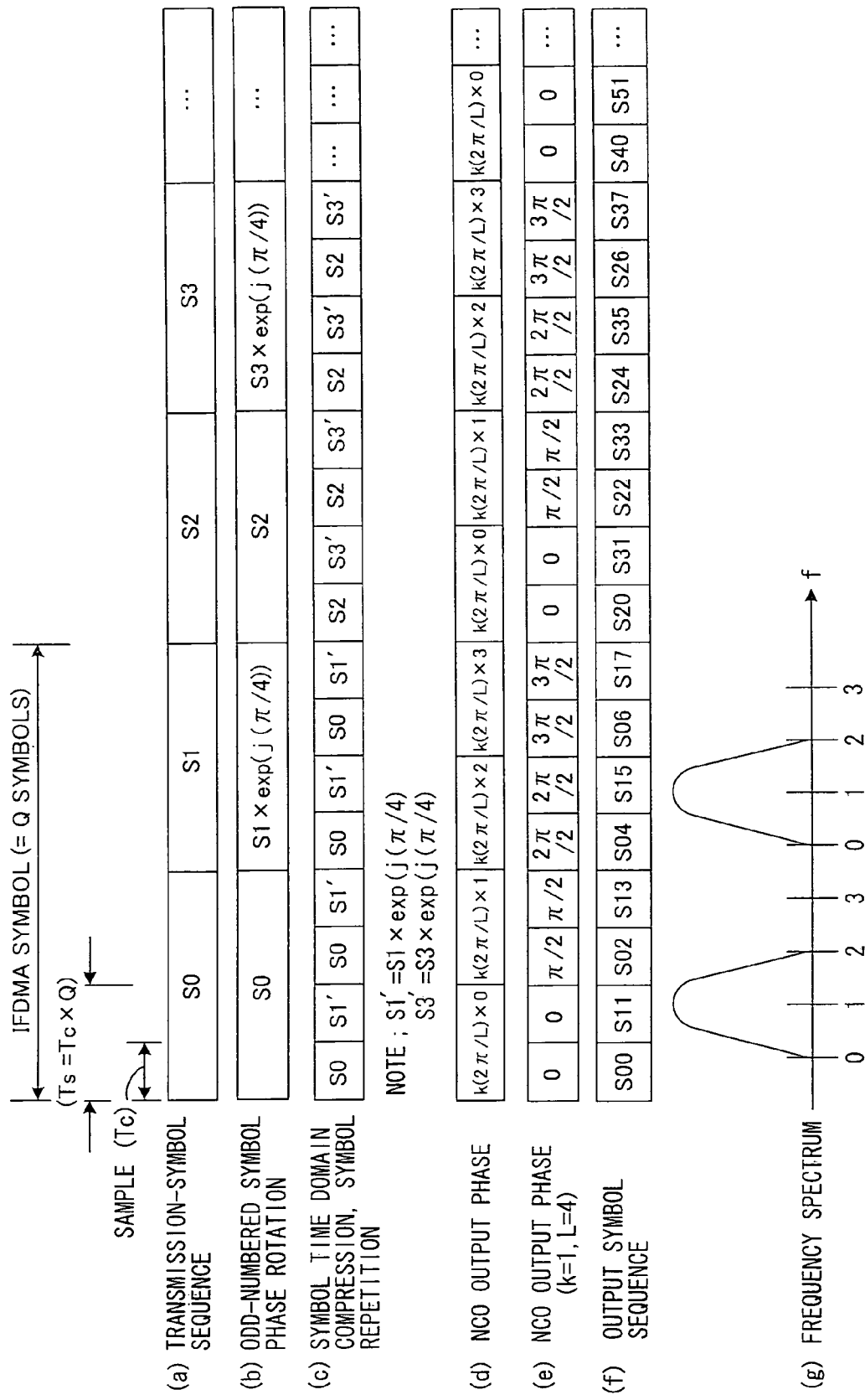
FIG. 15 is a drawing explaining the operation of the frequency-division multiplexing transmission apparatus.

FIG. 14 is a block diagram of a frequency-division multiplexing transmission apparatus of a fourth embodiment of the present invention, and FIG. 15 is a drawing explaining the operation of the frequency-division multiplexing transmission apparatus, where the same reference numbers are given to parts that are the same as those in the second embodiment shown in FIG. 7. This embodiment differs in that, in the second embodiment, the π/4-continuous-phase-rotation unit 13 performed phase rotation that increased in increments of π/4 (0, π/4, 2π/4, 3π/4, . . . ) for each input symbol, however in this fourth embodiment, a π/4-phase-rotation unit 51 rotates the phase of even-numbered or odd-numbered symbols by π/4 or −π/4 as shown in (b) of FIG. 15 (in the example of this embodiment, the phase of the odd-numbered symbols is rotated by π/4).

A channel-encoder 11 performs channel encoding of the input binary information sequence, and a QPSK-data-modulation unit 12 converts the channel-encoded data sequence to I, Q complex components (symbols) in QPSK, for example. As shown in (a) of FIG. 15, one IFDMA symbol is composed of Q-number of symbols S0, S1 (Q=2 in the figure).

The π/4-phase-rotation unit 51 rotates the phase of the odd-numbered symbols by π/4 (see (b) of FIG. 15), and a symbol-repetition and rearrangement unit 14 compresses the time domains of the two symbols S0, S1' of the IFDMA symbol, then repeats each of the symbols L times (L=4 in the figure) and rearranges the repetitive-symbol sequence so that it has the same arrangement as the symbol sequence S0, S1' (see (c) of FIG. 15). The odd numbered symbols S1, S3, S5, . . . which have undergone a π/4 phase rotation are represented by the symbols S1', S3', S5' . . . . Taking Tc to be a sample period, the symbol sequence S0, S1' is repeated at a period Ts=Q×Tc.

The complex multiplier CML of the phase-rotation unit 15 performs phase rotation specific to the mobile station for each symbol of the repetitive-symbol sequence. More specifically, the phase-rotation unit 15 changes the amount of phase rotation performed for each symbol in increments of k·2π/L at each period Ts (=Q×Tc) of the repetitive-symbol sequence as shown in (d) of FIG. 15. Here, k is an integer that is specific to the mobile station, and is any one value among 0, 1, 2, . . . , L−1. The wireless-transmission unit 16 performs up-conversion of the frequency of the signal that is input from the phase-rotation unit 15 from a baseband frequency to a radio frequency, after which it amplifies the signal and transmits it from an antenna.

As shown in (a) to (d) of FIG. 15, by compressing the time domains of each of the symbols S0, S1 of the transmission-symbol sequence, then repeating the symbols a specified number of times (L=4) and rearranging each of the symbols of the repetitive-symbol sequence so that they have the same arrangement as the symbol sequence S0, S1, a comb-tooth-shaped frequency spectrum occurs (see (g) of FIG. 15). By performing phase rotation that changes in increments of k·2π/L at each period Ts (=Q×Tc) of the repetitive-symbol sequence for each symbol of the repetitive-symbol sequence, the spectral position of the comb-tooth-shaped frequency spectrum is dependent on k and shifts in the same way as shown in FIG. 20.

In the NCO 17, the parameter-setting unit 20 sets k and L, which were obtained by notification from the base station, in a frequency-shifting unit 21, and the frequency-shifting unit 21 uses the parameters k, L to calculate the amount of change in phase rotation per period Ts of the repetitive-symbol sequence Δω (=k·2π/L), and outputs the result. The rotation-phase-amount-setting unit 22 comprises an adder ADD and a delay unit DLY that applies a delay time T (=Tc×Q), and it performs the calculation $$\theta = \theta + \Delta\omega$$

at each period Ts of the repetitive-symbol sequence, increases the amount of phase rotation θ in increments of Δω, and outputs the result (see (d) of FIG. 15). The delay-time-setting unit 23 sets the period Ts (=Tc×Q) of the repetitive-symbol sequence as the delay time T for the delay unit DLY. The converter 24 calculates the I, Q components (x, y) in the complex plane of the amount of the phase rotation amount θ, and inputs these components to the phase-rotation unit 15. When k=1, the amount of phase rotation θ changes in increments of π/2 at each period Ts (see (e) of FIG. 15), and the frequency spectrum becomes as shown in (g) of FIG. 15.

The complex multiplier CML of the phase-rotation unit 15 performs calculation according to the equation $$(X+jY) \times (x+jy)$$

with the symbols of the repetitive-symbol sequence represented by S (=X+jY), and outputs the calculation results.

In the frequency-division multiplexing transmission apparatus of this fourth embodiment, with k=1, L=4 and Q=2, the phase-rotation unit 15 performs phase rotation for each symbol of the repetitive-symbol sequence S00, S11, S02, S13, S04, S15, S06, S17 as shown in (e) of FIG. 15. As a result, the total amount of phase rotation performed for each symbol S00, S11, S02, S13, S04, S15, S06, S17 becomes as shown in FIG. 16. As can be clearly seen from FIG. 16, the amount of phase rotation performed for each symbol is an integer multiple of π/4. As a result, with this fourth embodiment, the phase between adjacent symbols does not change as π→0→π, it is possible to suppress a peak, and it is possible to effectively reduce PAPR.

(b) Frequency-Division-Multiplexing Receiving Apparatus

Figure 17:
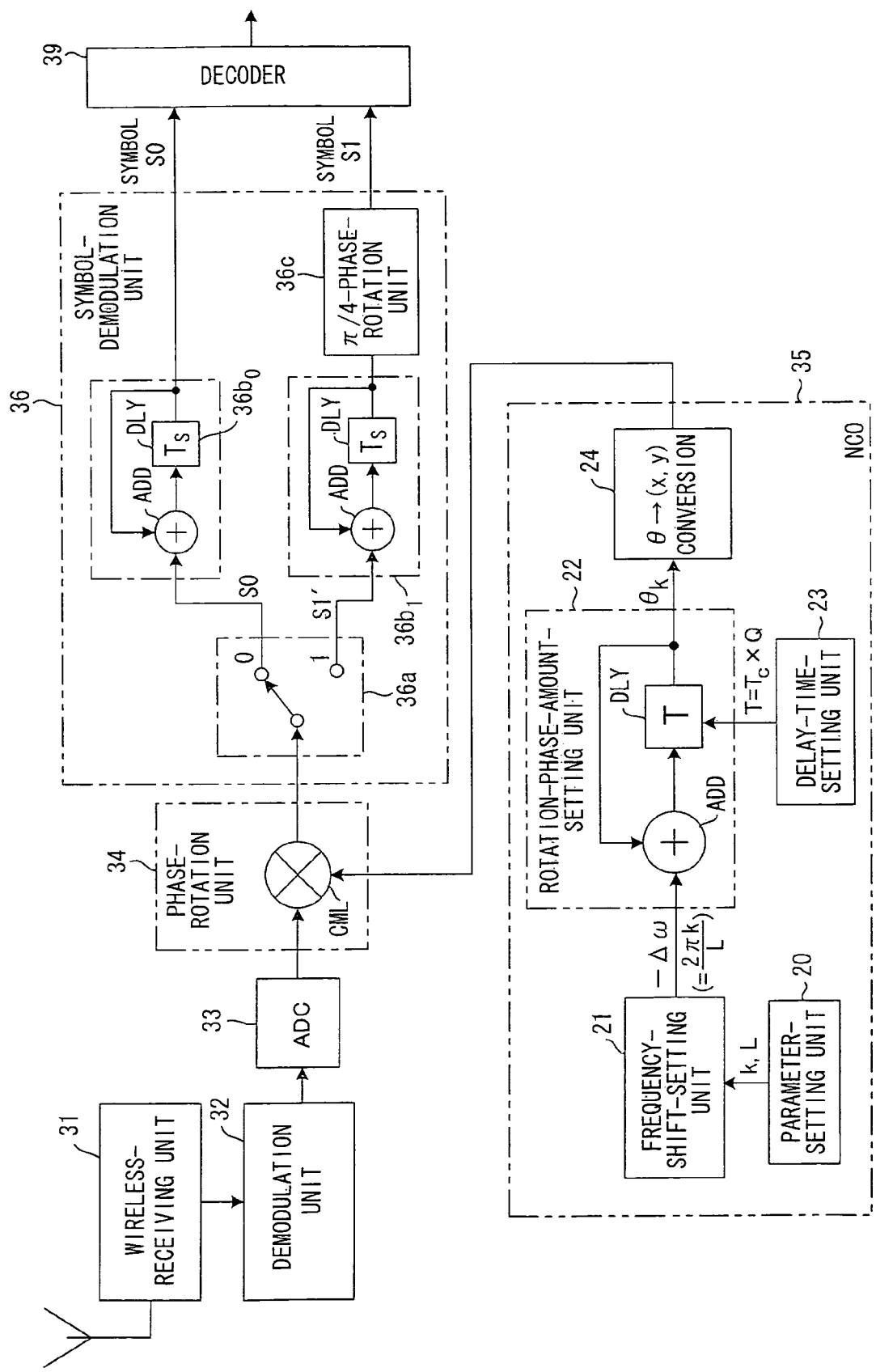
FIG. 17 is a block diagram of the frequency-division multiplexing receiving apparatus.
Figure 18:
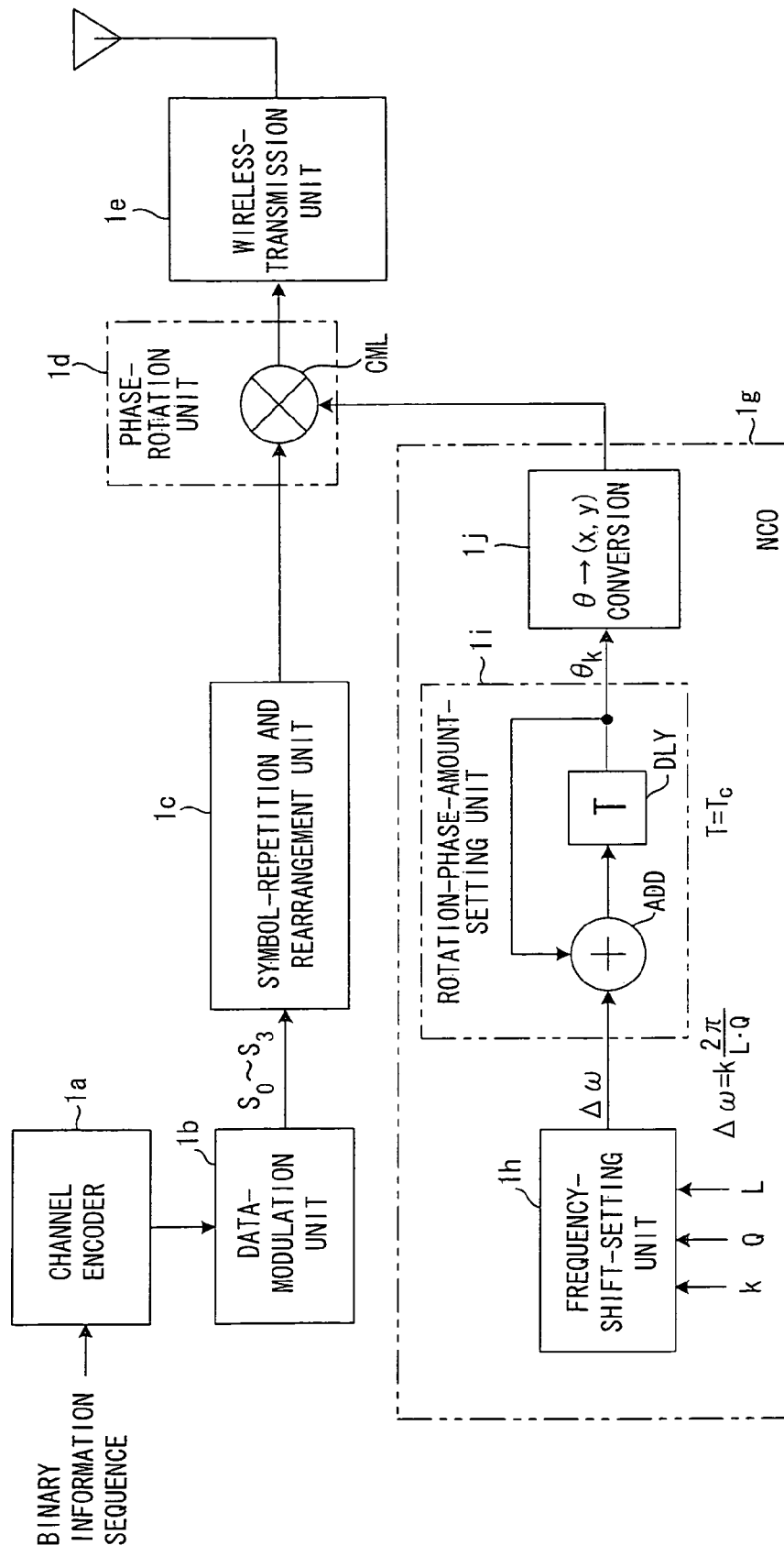
FIG. 18 is a drawing showing the construction of a mobile station that employs the IFDMA modulation method.
Figure 19:
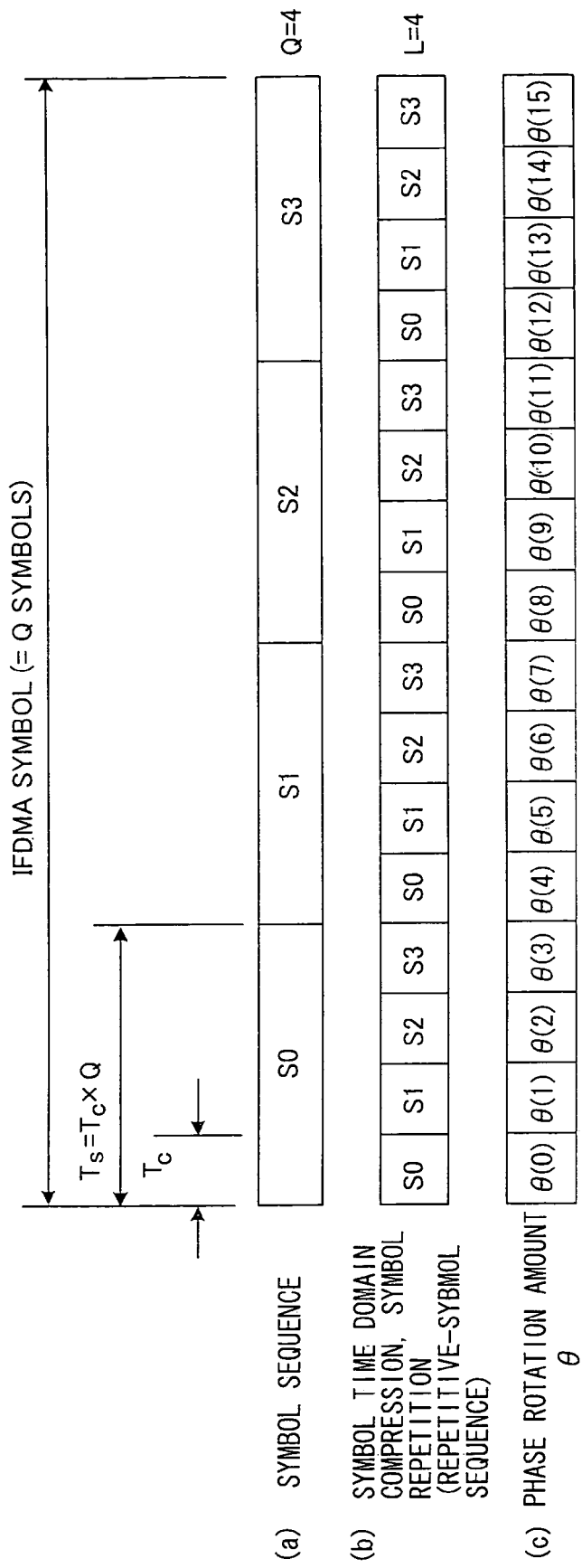
FIG. 19 is a drawing explaining IFDMA symbols.

FIG. 17 is a block diagram of a frequency-division multiplexing receiving apparatus, where the same reference numbers are given to parts that are the same as those of the frequency-division multiplexing receiving apparatus shown in FIG. 10.

A wireless-receiving unit 31 receives a wireless signal, and performs down-conversion of the frequency to a baseband signal, after which a QPSK-demodulation unit 32 performs QPSK demodulation of the baseband signal, and an AD converter 33 converts the demodulated result (symbols) to a digital signal and inputs it to a phase-rotation unit 34. An NCO 35 has construction similar to that of the NCO 17 of the frequency-division multiplexing transmission apparatus, and performs the calculation of the equation $$\theta = \theta - \Delta\omega$$

at each period Ts (=Tc×Q) of the repetitive-symbol sequence, and performs phase rotation in the opposite direction of transmission, or in other words, decreases the amount of phase rotation θ in decrements of −Δω.

A complex multiplier CML in the phase-rotation unit 34 performs phase rotation of the symbols input from the AD converter 33 according to the amount of phase rotation θ that is calculated using the above equation to restore the signal to its original phase, and inputs the generated repetitive-symbol sequence as shown in (c) of FIG. 15 to a symbol-demodulation unit 36. The symbol-demodulation unit 36 integrates the symbols S0 of the repetitive-symbol sequence to demodulate the transmission symbols S0, and integrates the symbols S1' of the repetitive-symbol sequence to demodulate the transmission symbols transmission symbol S1'. In other words, a switch 36a of the symbol-demodulation unit 36 switches output terminals 0 to 1 at the sample period Tc, and an integrator 36b₀ for symbols S0 integrates the repetitive symbols S0 to demodulate the transmission symbols S0, and similarly, an integrator 36b₁ for symbols S1' integrates the repetitive symbols S1' and a π/4-phase-rotation unit 36c rotates the phase of the integrated symbols S' by −π/4 to demodulate the transmission symbols S1'. A decoder 39 performs an error-correction-decoding process for each of the input symbols S0, S1, and inputs the result to a data-processing unit (not shown in the figure).

In FIG. 17, construction is shown for only one mobile station, however, there is a phase-rotation unit 34, NCO 35 and symbol-demodulation unit 36 for each mobile station.

With the frequency-division multiplexing receiving apparatus described above, it is possible to accurately demodulate the transmission symbols that were transmitted from the frequency-division multiplexing transmission apparatus of the fourth embodiment.

As many apparent and widely different embodiments of the present invention can be made without departing from the spirit and scope thereof, it is to be understood that the invention is not limited to the specific embodiments thereof except as defined in the appended claims.

What is claimed is:

1. A frequency-division multiplexing transmission apparatus for transmitting data in a frequency spectrum specific to a mobile station, comprising:

a first phase-rotation unit that performs phase rotation that increases in increments of π/4 or decreases in decrements of −π/4 for each symbol of a transmission-symbol sequence;

a symbol-repetition and rearrangement unit that compresses the time domains of each symbol of the transmission-symbol sequence after phase rotation, then repeats those symbols a specified number of times (L times), and rearranges the symbols of the obtained repetitive-symbol sequence so that the obtained respective-symbol sequence has the same arrangement as the transmission-symbol sequence;

a second phase-rotation unit that performs phase rotation that changes at a speed specific to the mobile station for each symbol of the rearranged repetitive-symbol sequence; and a transmission unit that transmits said phase-rotated symbols.

2. A frequency-division multiplexing transmission apparatus for transmitting data in a frequency spectrum specific to a mobile station, comprising:

a first phase-rotation unit that performs phase rotation that increases in increments of π/4 or decreases in decrements of −π/4 for each symbol of a transmission-symbol sequence;

a symbol-repetition and rearrangement unit that compresses the time domains of each symbol of the transmission-symbol sequence after phase rotation, then repeats those symbols a specified number of times (L times), and rearranges the symbols of the obtained repetitive-symbol sequence so that the obtained respective-symbol sequence has the same arrangement as the transmission-symbol sequence;

a second phase-rotation unit that performs phase rotation that changes at a speed specific to the mobile station for each symbol of the rearranged repetitive-symbol sequence; and a transmission unit that transmits said phase-rotated symbols; wherein said second phase-rotation unit changes the amount of rotation performed on each symbol of said repetitive-symbol sequence in increments of k·2π/L (where k is an integer specific to the mobile station) at each period of said repetitive-symbol sequence.

3. The frequency-division multiplexing transmission apparatus according to claim 2 wherein said second phase-rotation unit comprises:

a phase-rotation-generation unit for generating phase that increases in increments of k·2π/L at each period of said repetitive-symbol sequence; and a complex multiplier that performs the generated phase rotation on each symbol of said repetitive-symbol sequence.

4. A frequency-division multiplexing receiving apparatus according to claim 2 comprising:

a receiving unit that receives each symbol of a repetitive-symbol sequence that is transmitted from said transmission apparatus;

a phase-rotation unit that generates phase that changes in increments of k·2π/L (where k is an integer specific to the mobile station) at each period of said repetitive-symbol sequence for each mobile station, and performs phase rotation having that phase for each received symbol of the repetitive-symbol sequence; and a demodulation unit that combines components of identical symbols that are output from said phase-rotation unit, and performs phase rotation that decreases in decrements of −π/4 or increases in increments of π/4 for each symbol of the combined symbol sequence to demodulate the transmission symbols.

5. A frequency-division multiplexing transmission apparatus for transmitting data in a frequency spectrum specific to a mobile station, comprising:

a first phase-rotation unit that performs π/4 or −π/4 phase rotation for the even-numbered or odd-numbered symbols of a transmission-symbol sequence;

a symbol-repetition and rearrangement unit that compresses the time domains of each symbol of the transmission-symbol sequence after phase rotation, then repeats those symbols a specified number of times (L times), and rearranges the symbols of the obtained repetitive-symbol sequence so that the obtained respective-symbol sequence has the same arrangement as the transmission-symbol sequence;

a second phase-rotation unit that performs phase rotation that changes at a speed specific to the mobile station for each symbol of the repetitive-symbol sequence; and a transmission unit that transmits said phase-rotated symbols.

6. A frequency-division multiplexing transmission apparatus for transmitting data in a frequency spectrum specific to a mobile station, comprising:

a first phase-rotation unit that performs π/4 or −π/4 phase rotation for the even-numbered or odd-numbered symbols of a transmission-symbol sequence;

a symbol-repetition and rearrangement unit that compresses the time domains of each symbol of the transmission-symbol sequence after phase rotation, then repeats those symbols a specified number of times (L times), and rearranges the symbols of the obtained repetitive-symbol sequence so that the obtained respective-symbol sequence has the same arrangement as the transmission-symbol sequence;

a second phase-rotation unit that performs phase rotation that changes at a speed specific to the mobile station for each symbol of the repetitive-symbol sequence; and a transmission unit that transmits said phase-rotated symbols; wherein said second phase-rotation unit changes the amount of rotation performed on each symbol of said repetitive-symbol sequence in increments of k·2π/L (where k is an integer specific to the mobile station) at each period of said repetitive-symbol sequence.

7. The frequency-division multiplexing transmission apparatus according to claim 6 wherein said second phase-rotation unit comprises:

a phase-rotation-generation unit for generating phase that increases in increments of k·2π/L at each period of said repetitive-symbol sequence; and a complex multiplier that performs the generated phase rotation on each symbol of said repetitive-symbol sequence.

8. A frequency-division multiplexing receiving apparatus according to claim 6 comprising:

a receiving unit for receiving each symbol of a repetitive-symbol sequence that is transmitted from said transmission apparatus;

a phase-rotation unit that generates phase that changes in increments of k·2π/L (where k is an integer specific to the mobile station) at each period of said repetitive-symbol sequence for each mobile station, and performs phase rotation having that phase for each received symbol of the repetitive-symbol sequence; and a demodulation unit that combines components of identical symbols that are output from said phase-rotation unit, and performs $-\pi/4$ or $\pi/4$ phase rotation for the even-numbered or odd-numbered symbols to demodulate the transmission symbols.

9. A frequency-division multiplexing transmission method for transmitting data in a frequency spectrum specific to a mobile station, comprising:

a first step of performing phase rotation that increases in increments of $\pi/4$ or decreases in decrements of $-\pi/4$ for each symbol of a transmission-symbol sequence;

a second step of compressing the time domains of each symbol of the transmission-symbol sequence after phase rotation, then repeating those symbols a specified number of times (L times), and rearranging the symbols of the obtained repetitive-symbol sequence so that the obtained respective-symbol sequence has the same arrangement as the transmission-symbol sequence;

a third step of performing phase rotation that changes at a speed specific to the mobile station for each symbol of the repetitive-symbol sequence; and a fourth step of transmitting said phase-rotated symbols; wherein in said third step, the amount of rotation performed on each symbol of said repetitive-symbol sequence changes in increments of $k \cdot 2\pi/L$ (where k is an integer specific to the mobile station) at each period of said repetitive-symbol sequence.

10. The frequency-division multiplexing transmission method according to claim 9 wherein said third step comprises:

a step of generating phase that increases in increments of $k \cdot 2\pi/L$ at each period of said repetitive-symbol sequence; and a step of performing the generated phase rotation on each symbol of said repetitive-symbol sequence.

11. A frequency-division multiplexing receiving method according to claim 9 comprising:

a fifth step of receiving each symbol of a repetitive-symbol sequence that is transmitted from said transmission apparatus;

a sixth step of generating phase that changes in increments of $k \cdot 2\pi/L$ (where k is an integer specific to the mobile station) at each period of said repetitive-symbol sequence for each mobile station, and performing phase rotation having that phase for each received symbol of the repetitive-symbol sequence; and a seventh step of combining components of identical symbols that are output from said phase-rotation unit, and performing phase rotation that decreases in decrements of $-\pi/4$ or increases in increments of $\pi/4$ for each symbol of the combined symbol sequence to demodulate the transmission symbols.

12. A frequency-division multiplexing transmission method for transmitting data in a frequency spectrum specific to a mobile station, comprising:

a first step of performing $\pi/4$ or $-\pi/4$ phase rotation for the even-numbered or odd-numbered symbols of a transmission-symbol sequence;

a second step of compressing the time domains of each symbol of the transmission-symbol sequence after phase rotation, then repeating those symbols a specified number of times (L times), and rearranging the symbols of the obtained repetitive-symbol sequence so that the obtained respective-symbol sequence has the same arrangement as the transmission-symbol sequence;

a third step of performing phase rotation that changes at a speed specific to the mobile station for each symbol of the repetitive-symbol sequence; and a fourth step of transmitting said phase-rotated symbols; wherein in said third step, the amount of rotation performed on each symbol of said repetitive-symbol sequence changes in increments of $k \cdot 2\pi/L$ (where k is an integer specific to the mobile station) at each period of said repetitive-symbol sequence.

13. The frequency-division multiplexing transmission method according to claim 12 wherein said third step comprises:

a step of generating phase that increases in increments of $k \cdot 2\pi/L$ at each period of said repetitive-symbol sequence; and a step of performing the generated phase rotation on each symbol of said repetitive-symbol sequence.

14. A frequency-division multiplexing receiving method according to claim 12 comprising:

a fifth step receiving each symbol of a repetitive-symbol sequence that is transmitted from said transmission apparatus;

a sixth step of generating phase that changes in increments of $k \cdot 2\pi/L$ (where k is an integer specific to the mobile station) at each period of said repetitive-symbol sequence for each mobile station, and performing phase rotation having that phase for each received symbol of the repetitive-symbol sequence; and a seventh step of combining components of identical symbols that are output from said phase-rotation unit, and performing $-\pi/4$ or $\pi/4$ phase rotation for even-numbered or odd-numbered symbols to demodulate the transmission symbols.

\* \* \* \* \*